(12) United States Patent
Wang

(10) Patent No.: US 11,137,571 B2
(45) Date of Patent: Oct. 5, 2021

(54) CAMERA LENS ASSEMBLY

(71) Applicant: ZHEJIANG SUNNY OPTICAL CO., LTD., Ningbo (CN)

(72) Inventor: Xinquan Wang, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 187 days.

(21) Appl. No.: 16/231,092

(22) Filed: Dec. 21, 2018

(65) Prior Publication Data

US 2019/0196141 A1    Jun. 27, 2019

Related U.S. Application Data

(63) Continuation of application No. PCT/CN2018/080106, filed on Mar. 23, 2018.

(30) Foreign Application Priority Data

Aug. 24, 2017  (CN) .......................... 201710735300.8
Aug. 24, 2017  (CN) .......................... 201721066452.5

(51) Int. Cl.
*G02B 9/34* (2006.01)
*G02B 13/18* (2006.01)
*G02B 13/00* (2006.01)

(52) U.S. Cl.
CPC ............. *G02B 9/34* (2013.01); *G02B 13/004* (2013.01); *G02B 13/18* (2013.01); *G02B 13/008* (2013.01)

(58) Field of Classification Search
CPC ........ G02B 9/34; G02B 13/18; G02B 13/004; G02B 13/008; G02B 9/60; G02B 9/62; G02B 9/64

USPC ................... 359/754, 771, 772, 780
See application file for complete search history.

(56) References Cited

U.S. PATENT DOCUMENTS

| 8,730,590 B1* | 5/2014 | Tsai | G02B 13/004 |
| | | | 359/715 |
| 2012/0236421 A1* | 9/2012 | Tsai | G02B 9/34 |
| | | | 359/780 |
| 2014/0036133 A1* | 2/2014 | Sekine | G02B 9/34 |
| | | | 359/780 |

(Continued)

FOREIGN PATENT DOCUMENTS

CN    207473174    6/2018

OTHER PUBLICATIONS

Office Action from corresponding Chinese Appliation No. 201710735300.8, dated Feb. 20, 2019.

*Primary Examiner* — Marin Pichler
*Assistant Examiner* — Alberto J Betancourt
(74) *Attorney, Agent, or Firm* — Hauptman Ham, LLP

(57) ABSTRACT

The present disclosure discloses a camera lens assembly. The camera lens assembly includes, sequentially along an optical axis from an object side to an image side, a first lens, a second lens, a third lens, and a fourth lens. An object-side surface of the first lens and an object-side surface of the second lens are convex surfaces. An image-side surface of the third lens is a convex surface. An image-side surface of the fourth lens is a concave surface. Each of the first lens and the third lens has a positive refractive power. Each of the second lens and the fourth lens has a positive refractive power or a negative refractive power. A total effective focal length f of the camera lens assembly and an entrance pupil diameter EPD of the camera lens assembly satisfy: f/EPD<1.5.

18 Claims, 21 Drawing Sheets

(56) References Cited

U.S. PATENT DOCUMENTS

2016/0266349 A1* 9/2016 Tang .................. G02B 13/0045
2017/0017065 A1* 1/2017 Liu ................... G02B 13/0045
2019/0101724 A1* 4/2019 Chen ........................ G02B 7/32

* cited by examiner

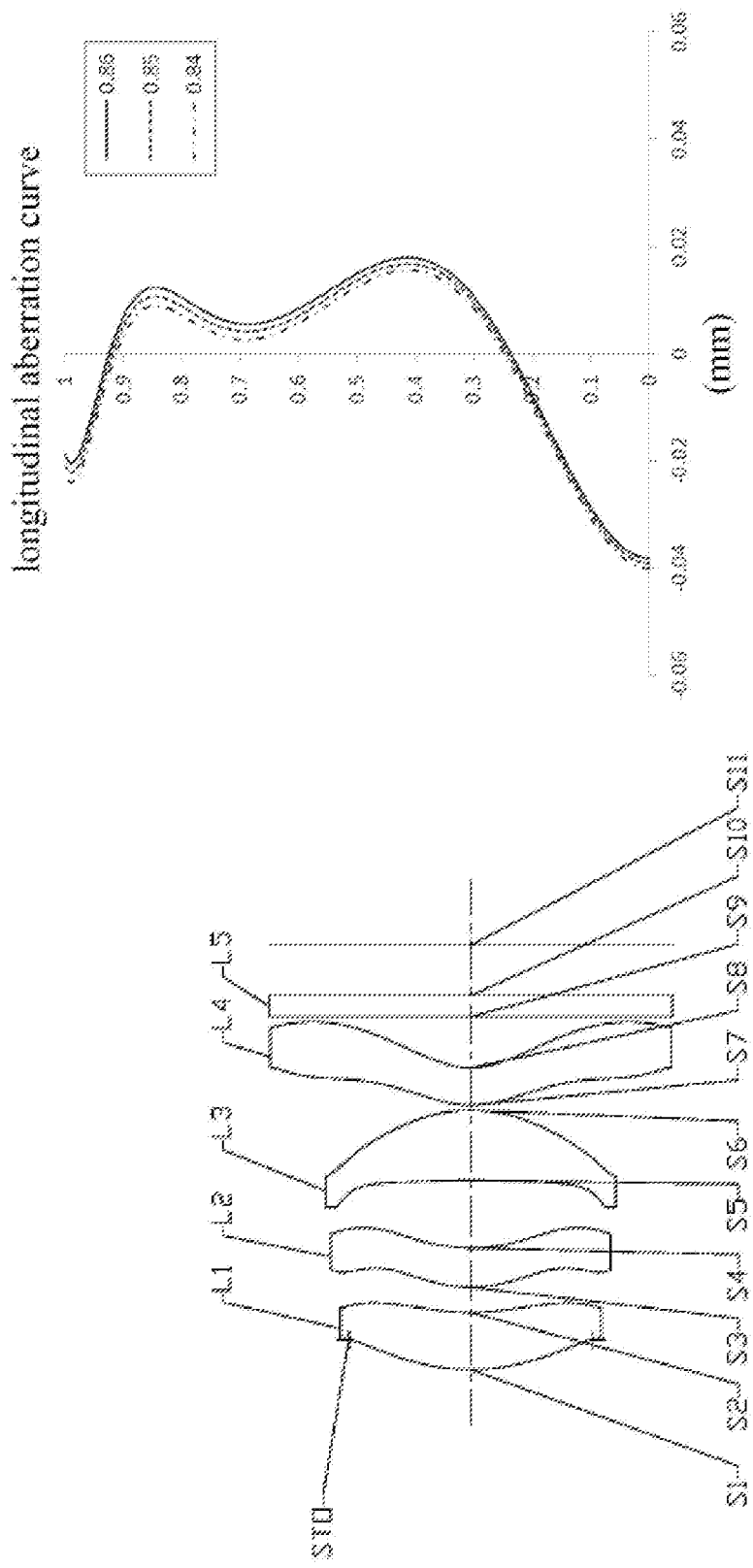

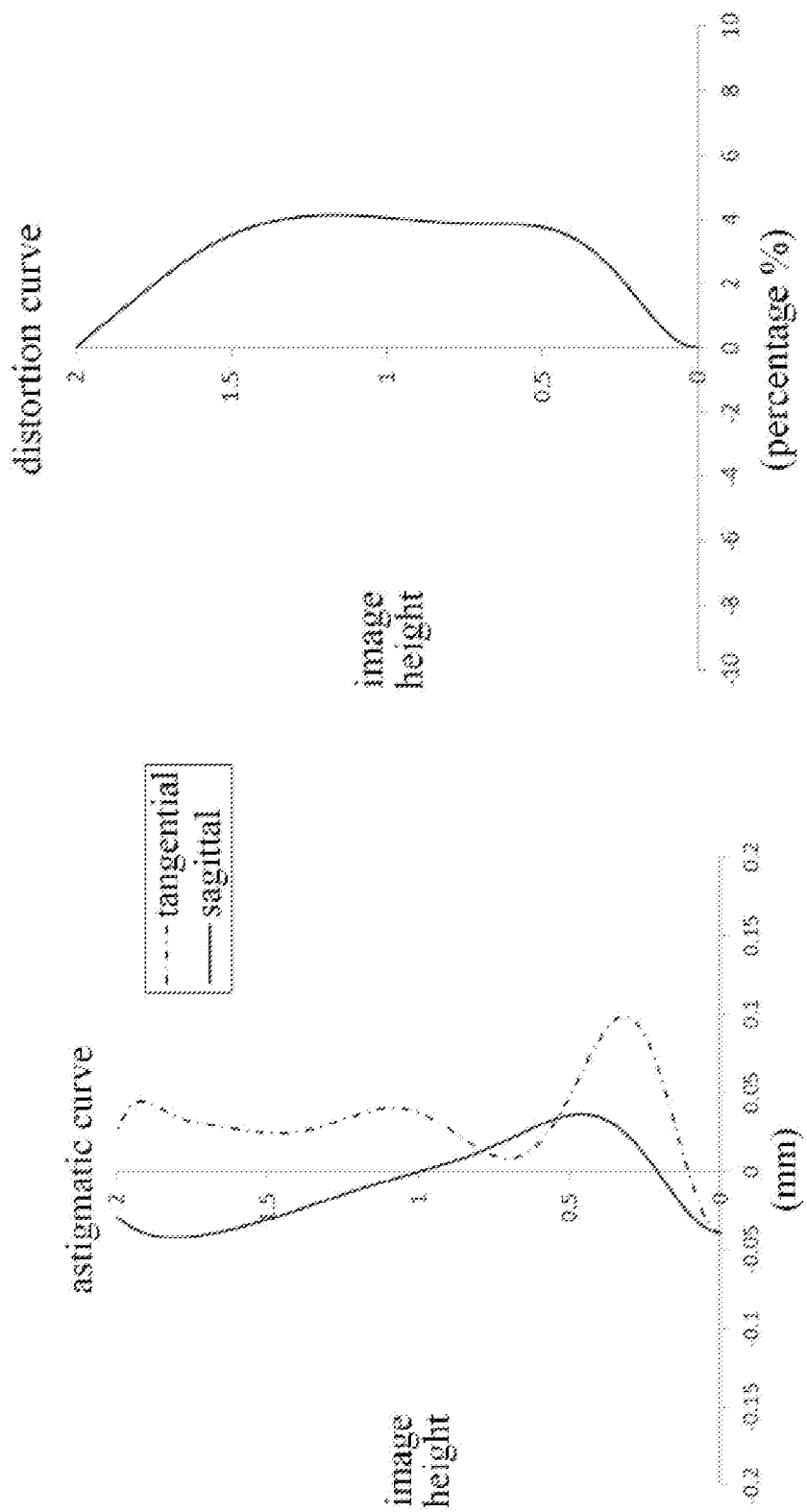

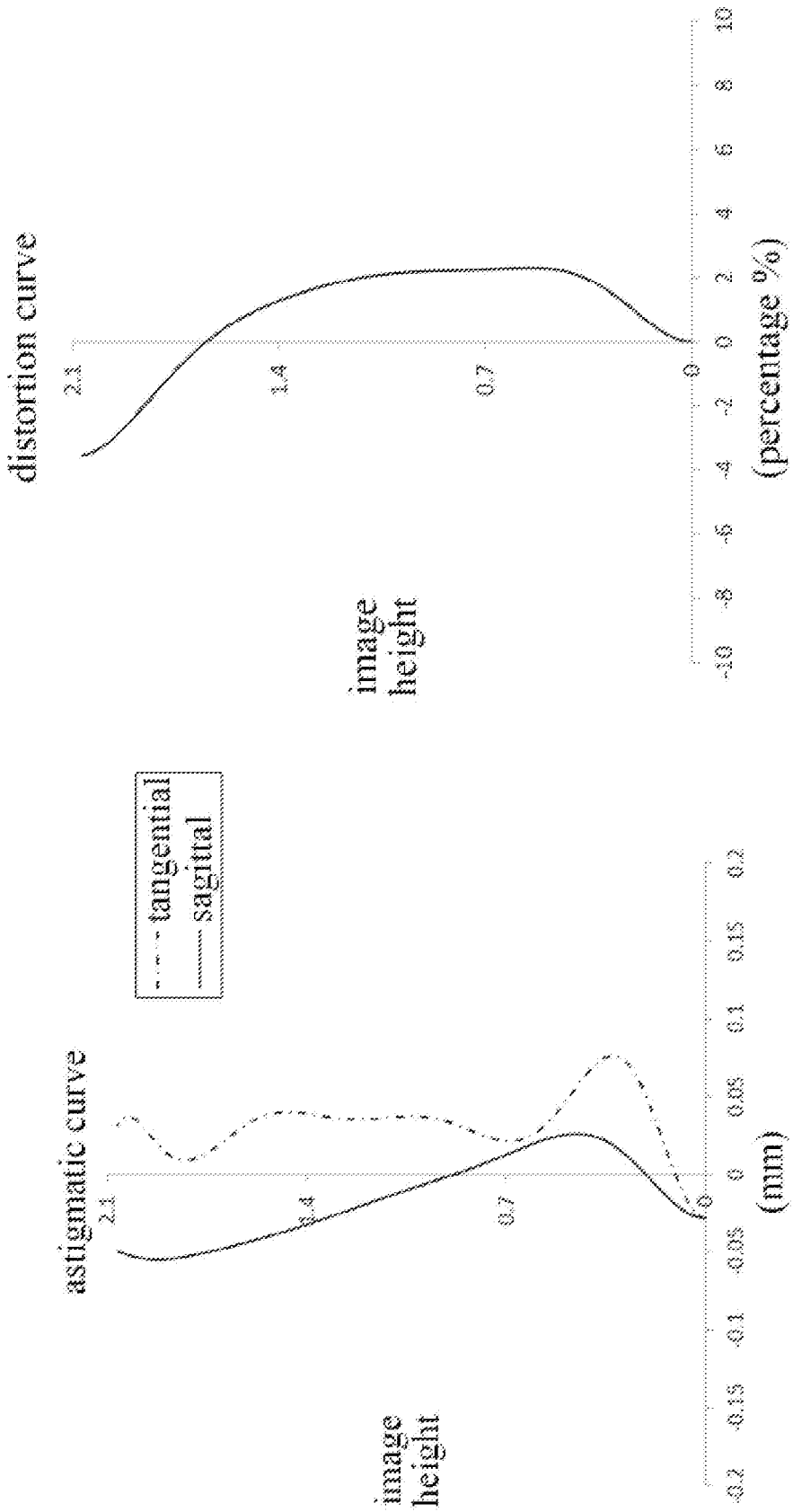

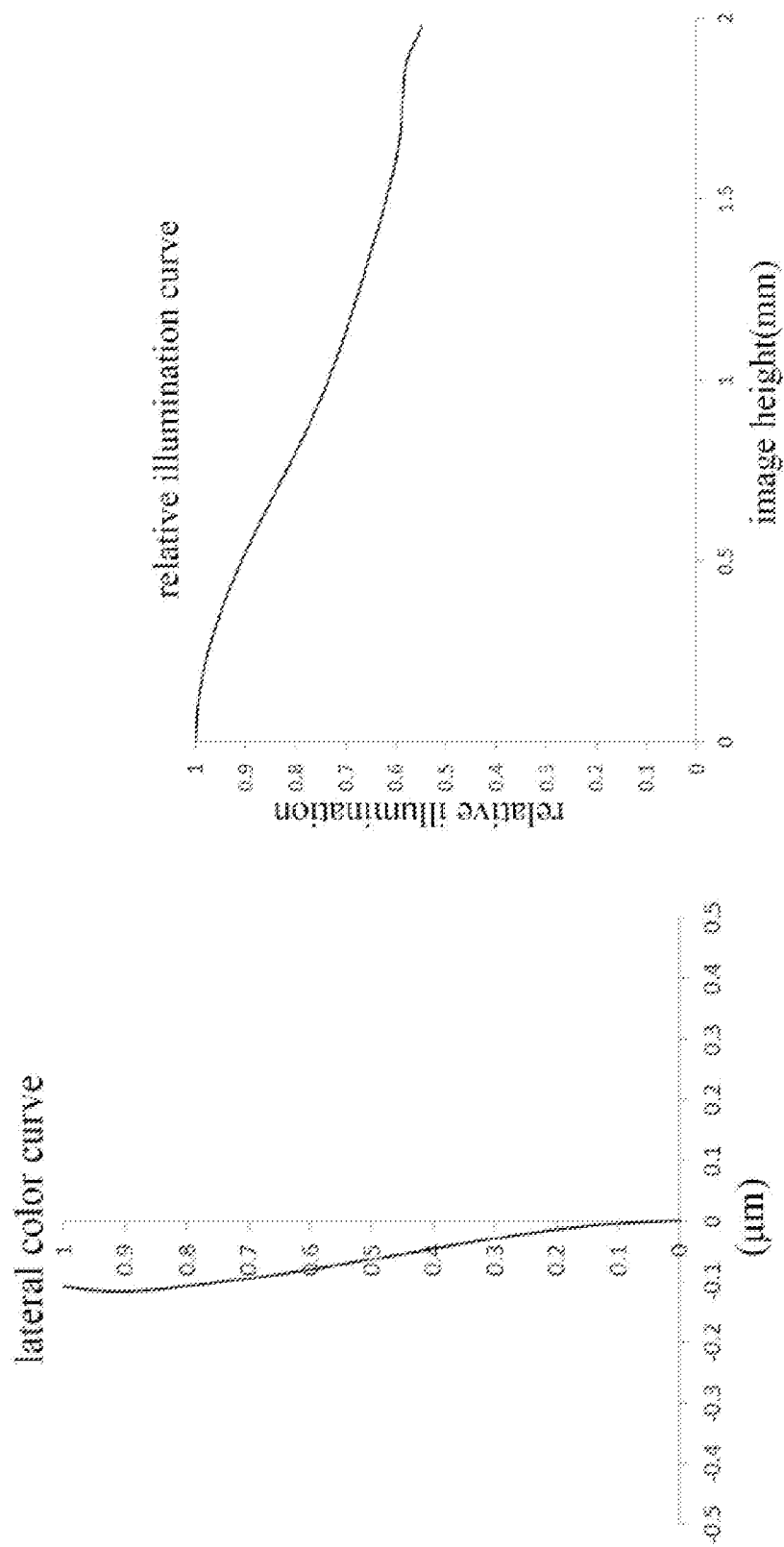

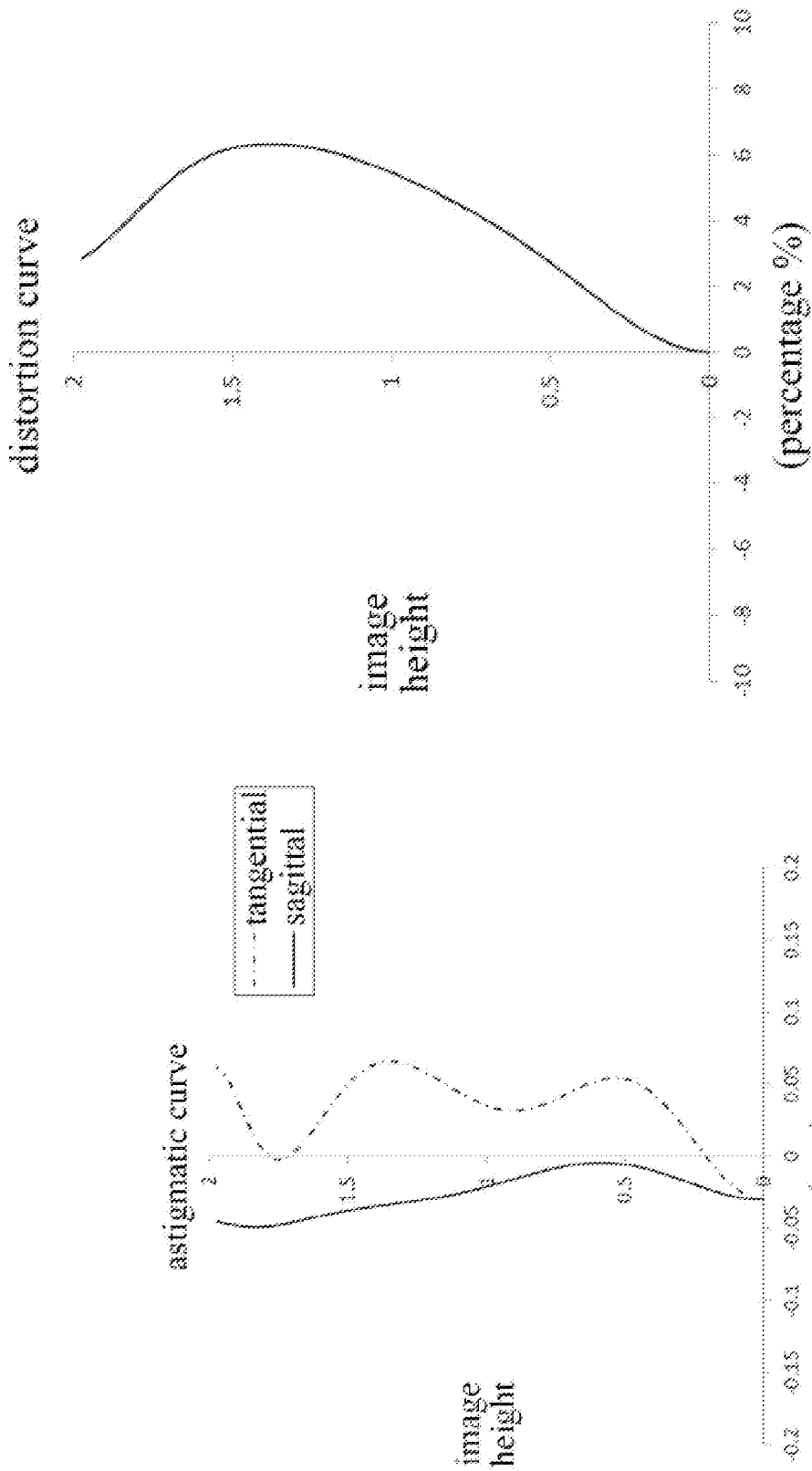

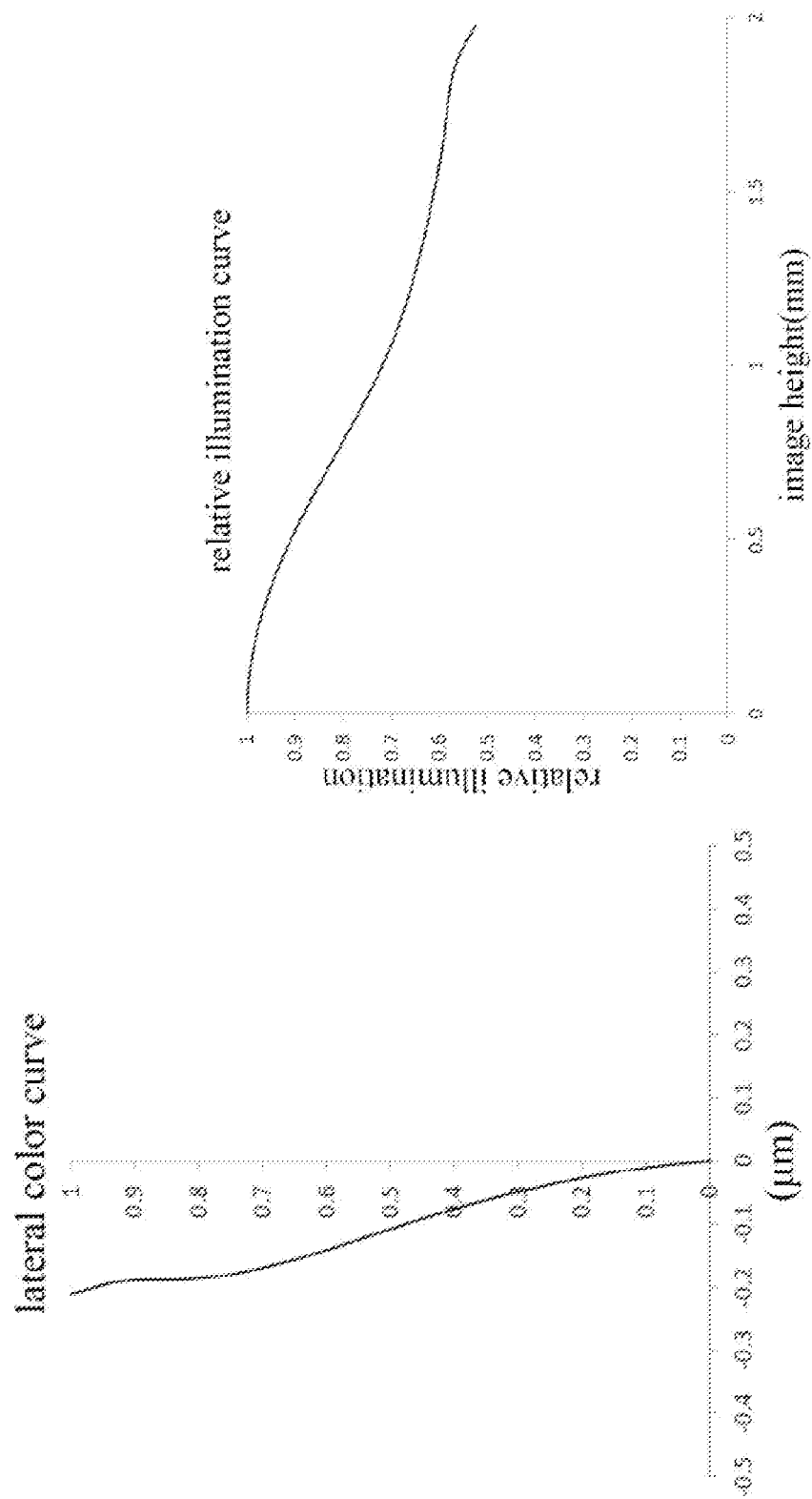

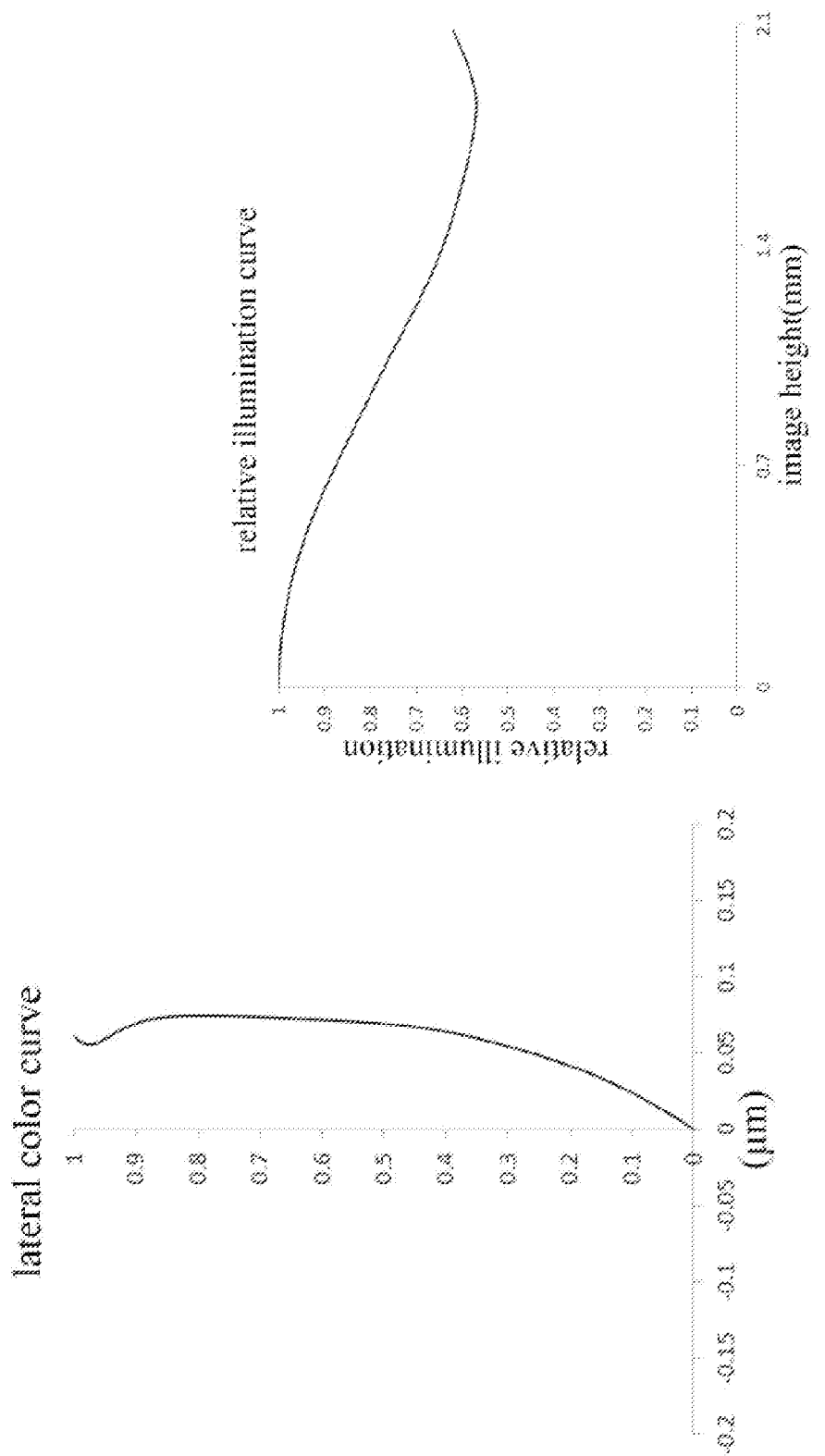

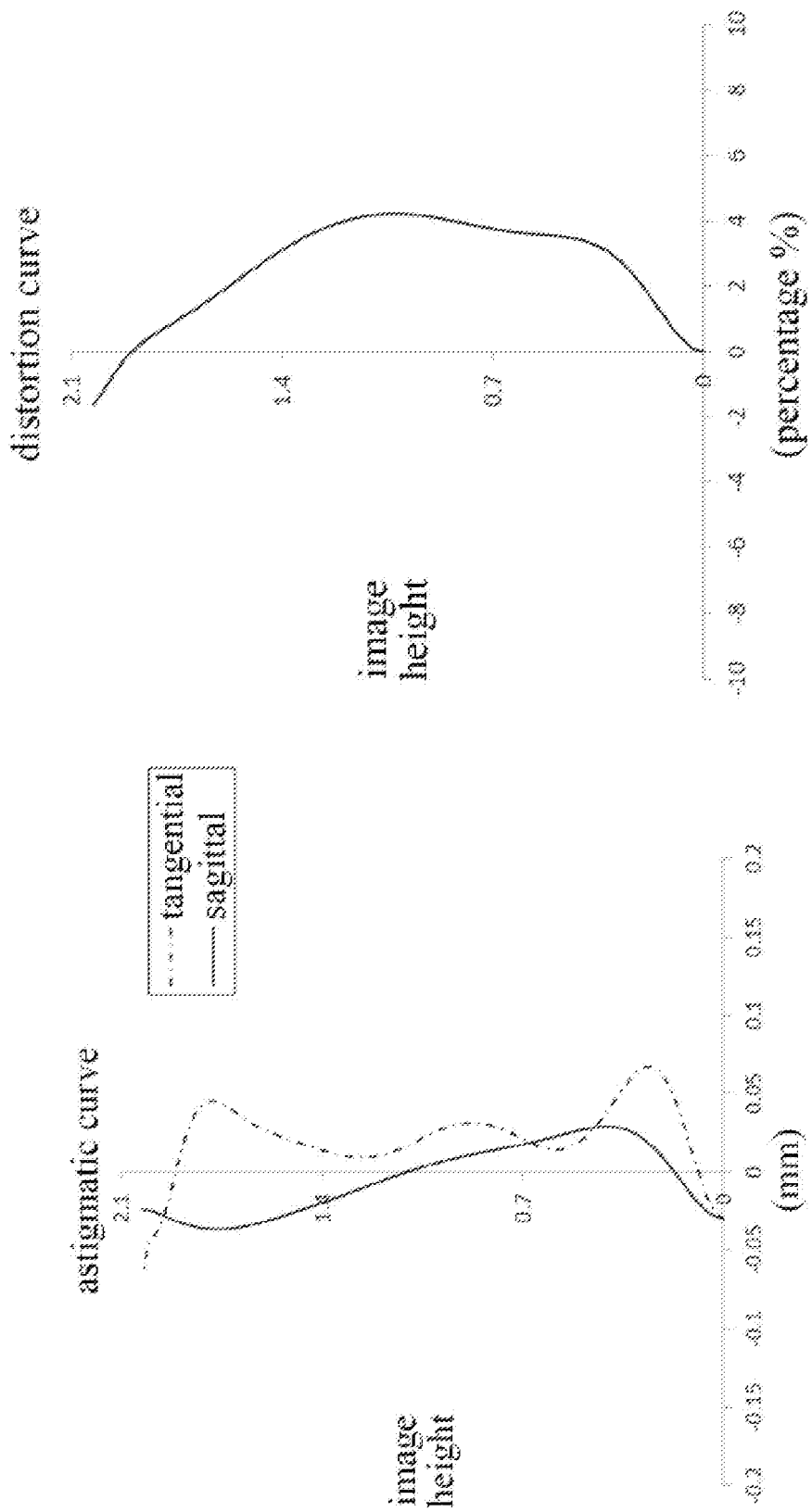

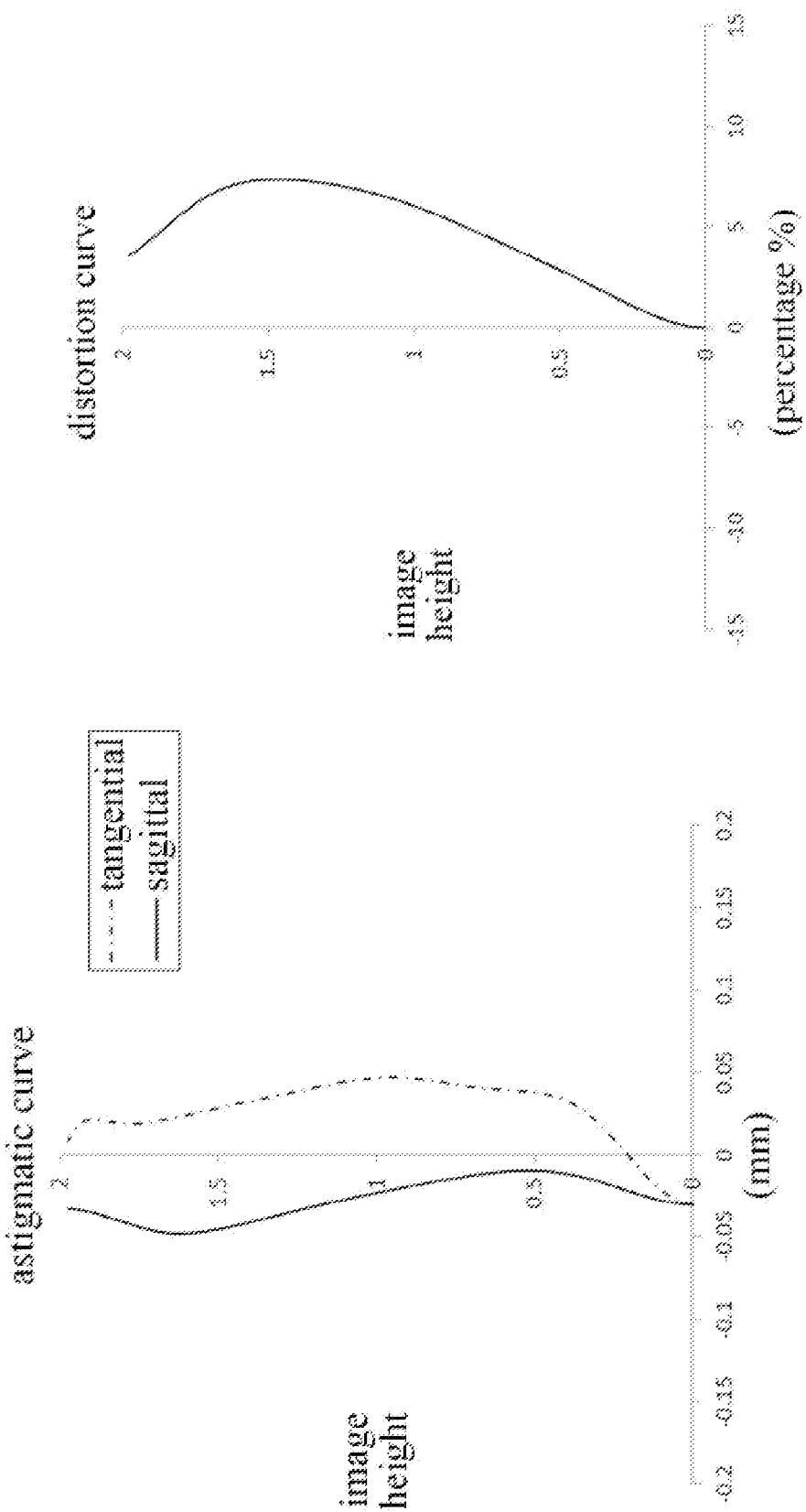

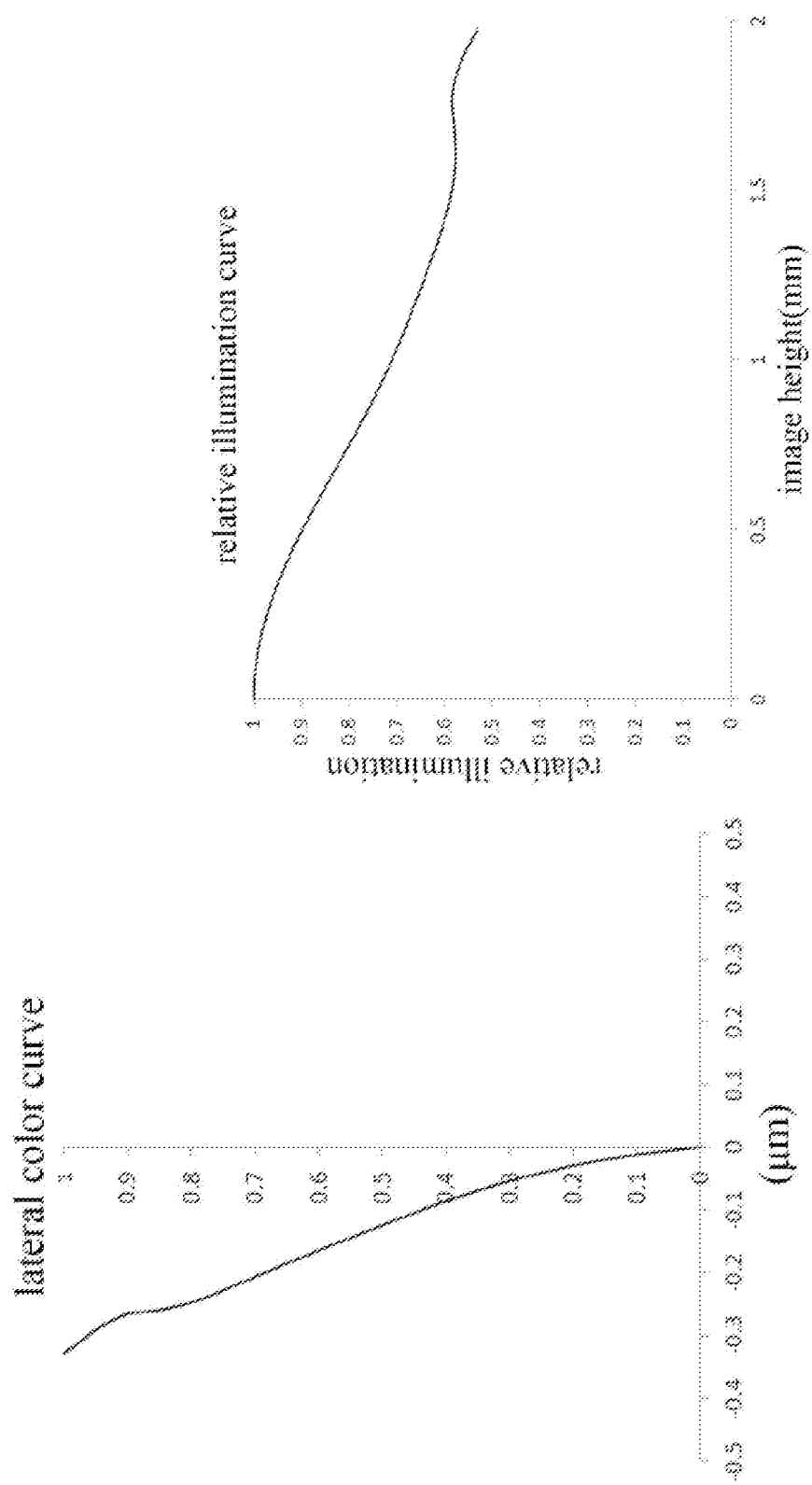

CAMERA LENS ASSEMBLY

CROSS-REFERENCE TO RELATED APPLICATIONS

This application is a continuation of International Application No. PCT/CN2018/080106, filed on Mar. 23, 2018, which claims the priorities and rights to Chinese Patent Application No. 201710735300.8 and Chinese Patent Application No. 201721066452.5 filed with the China National Intellectual Property Administration (CNIPA) on Aug. 24, 2017. All of the aforementioned applications are hereby incorporated by reference in their entireties.

TECHNICAL FIELD

The present disclosure relates to a camera lens assembly, and more specifically to a high-brightness camera lens assembly including four lenses and having a large aperture.

BACKGROUND

With the performance improvement and size reduction of common photosensitive elements such as charge-coupled devices (CCD) or complementary metal-oxide semiconductor elements (CMOS), requirements on high imaging quality and miniaturization of assorted optical imaging systems are higher.

In order to meet the miniaturization requirement, a typical configuration of an existing camera lens assembly has an F-number Fno (total effective focal length of the lens assembly/entrance pupil diameter of the lens assembly) of 2.0 or above, to achieve both the miniaturization and good optical performance. With the continuous development of portable electronic products such as smart phones, requirements for assorted camera lens assemblies are higher. In particular, in situations such as insufficient lights (e.g., cloudy and rainy days, or at dusk) or hand trembling, the camera lens assembly having the F-number Fno of 2.0 or above is unable to meet the higher imaging requirements.

In particular, in the field of infrared camera, the camera lens assembly needs to have a small size as well as a large aperture and a high brightness, to ensure the good application of the infrared lens assembly in the fields such as detection and recognition.

SUMMARY

The present disclosure provides a camera lens assembly which may be applicable to portable electronic products and may avoid at least one of the above disadvantages in the existing technology.

According to an aspect, the present disclosure provides a camera lens assembly. The camera lens assembly includes, sequentially along an optical axis from an object side to an image side, a first lens, a second lens, a third lens, and a fourth lens. An object-side surface of the first lens and an object-side surface of the second lens may both be convex surfaces. An image-side surface of the third lens may be a convex surface. An image-side surface of the fourth lens may be a concave surface. Each of the first lens and the third lens may have a positive refractive power. Each of the second lens and the fourth lens may have a positive refractive power or a negative refractive power. A total effective focal length f of the camera lens assembly and an entrance pupil diameter EPD of the camera lens assembly may satisfy: f/EPD<1.5.

In an implementation, an image-side surface of the second lens may be a concave surface. A radius R3 of curvature of the object-side surface of the second lens and a radius R4 of curvature of the image-side surface of the second lens may satisfy: $0.5<R3/R4<1$.

In an implementation, the second lens may have a positive refractive power. An effective focal length f2 of the second lens and the total effective focal length f of the camera lens assembly may satisfy: $2<f2/f<8$.

In an implementation, a radius R1 of curvature of the object-side surface of the first lens and the total effective focal length f of the camera lens assembly may satisfy: $0.5<R1/f<1.2$.

In an implementation, a spacing distance T12 along the optical axis between the first lens and the second lens and an axial distance TTL from the object-side surface of the first lens to an image plane of the camera lens assembly may satisfy: $T12/TTL<0.2$.

In an implementation, a center thickness CT1 of the first lens along the optical axis and a center thickness CT3 of the third lens along the optical axis may satisfy: $0.6<CT1/CT3<1.3$.

In an implementation, the center thickness CT1 of the first lens along the optical axis, a center thickness CT2 of the second lens along the optical axis, and the center thickness CT3 of the third lens along the optical axis may satisfy: $0.4<CT1/(CT2+CT3)<0.9$.

In an implementation, a sum ΣCT of a center thickness of the first lens along the optical axis, a center thickness of the second lens along the optical axis, a center thickness of the third lens along the optical axis, and a center thickness of the fourth lens along the optical axis, and the axial distance TTL from the object-side surface of the first lens to the image plane of the camera lens assembly may satisfy: $ΣCT/TTL<0.6$.

In an implementation, at least one of an object-side surface of the fourth lens or the image-side surface of the fourth lens may have at least one inflection point.

In an implementation, an effective semi-diameter DT42 of the image-side surface of the fourth lens and a half ImgH of a diagonal length of an effective pixel area on the image plane of the camera lens assembly may satisfy: $0.7<DT42/ImgH<1$.

In an implementation, an effective semi-diameter DT11 of the object-side surface of the first lens and the half ImgH of the diagonal length of the effective pixel area on the image plane of the camera lens assembly may satisfy: $0.5<DT11/ImgH<1$.

In an implementation, a distance SAG21 along the optical axis from an intersection point of the object-side surface of the second lens with the optical axis to a vertex of an effective semi-diameter of the object-side surface of the second lens and a center thickness CT2 of the second lens along the optical axis may satisfy: $0<SAG21/CT2<0.7$.

In an implementation, the camera lens assembly may further include an infrared bandpass filter disposed between the fourth lens and the image plane.

According to another aspect, the present disclosure further provides a camera lens assembly. The camera lens assembly includes, sequentially along an optical axis from an object side to an image side, a first lens, a second lens, a third lens, and a fourth lens. An object-side surface of the first lens may be a convex surface. At least one of an object-side surface of the third lens or an image-side surface of the third lens may be a convex surface. At least one of an object-side surface of the fourth lens or an image-side surface of the fourth lens may be a concave surface. At least two of the first lens, the third lens, and the fourth lens may have positive refractive powers. The second lens may have a positive refractive power. An effective focal length f2 of the second lens and a total effective focal length f of the camera lens assembly may satisfy: 2<f2/f<8.

In an implementation, each of the first lens and the third lens may have a positive refractive power.

In an implementation, the image-side surface of the fourth lens may be a concave surface.

In an implementation, an object-side surface of the second lens may be a convex surface, and an image-side surface of the second lens may be a concave surface.

According to another aspect, the present disclosure further provides a camera lens assembly. The camera lens assembly includes, sequentially along an optical axis from an object side to an image side, a first lens, a second lens, a third lens, and a fourth lens. An object-side surface of the first lens and an object-side surface of the second lens may both be convex surfaces. An image-side surface of the third lens may be a convex surface. An image-side surface of the fourth lens may be a concave surface. Each of the first lens and the third lens may have a positive refractive power. Each of the second lens and the fourth lens may have a positive refractive power or a negative refractive power. An effective semi-diameter DT11 of the object-side surface of the first lens and a half ImgH of a diagonal length of an effective pixel area on an image plane of the camera lens assembly may satisfy: 0.5<DT11/ImgH<1.

According to another aspect, the present disclosure further provides a camera lens assembly. The camera lens assembly includes, sequentially along an optical axis from an object side to an image side, a first lens, a second lens, a third lens, and a fourth lens. An object-side surface of the first lens and an object-side surface of the second lens may both be convex surfaces. An image-side surface of the third lens may be a convex surface. An image-side surface of the fourth lens may be a concave surface. Each of the first lens and the third lens may have a positive refractive power. Each of the second lens and the fourth lens may have a positive refractive power or a negative refractive power. A radius R3 of curvature of the object-side surface of the second lens and a radius R4 of curvature of an image-side surface of the second lens may satisfy: 0.5<R3/R4<1.

According to another aspect, the present disclosure further provides a camera lens assembly. The camera lens assembly includes, sequentially along an optical axis from an object side to an image side, a first lens, a second lens, a third lens, and a fourth lens. An object-side surface of the first lens and an object-side surface of the second lens may both be convex surfaces. An image-side surface of the third lens may be a convex surface. An image-side surface of the fourth lens may be a concave surface. Each of the first lens and the third lens may have a positive refractive power. Each of the second lens and the fourth lens may have a positive refractive power or a negative refractive power. An effective semi-diameter DT42 of the image-side surface of the fourth lens and a half ImgH of a diagonal length of an effective pixel area on an image plane of the camera lens assembly may satisfy: 0.7<DT42/ImgH<1.

According to another aspect, the present disclosure further provides a camera lens assembly. The camera lens assembly includes, sequentially along an optical axis from an object side to an image side, a first lens, a second lens, a third lens, and a fourth lens. An object-side surface of the first lens and an object-side surface of the second lens may both be convex surfaces. An image-side surface of the third lens may be a convex surface. An image-side surface of the fourth lens may be a concave surface. Each of the first lens and the third lens may have a positive refractive power. Each of the second lens and the fourth lens may have a positive refractive power or a negative refractive power. A distance SAG21 along the optical axis from an intersection point of the object-side surface of the second lens with the optical axis to a vertex of an effective semi-diameter of the object-side surface of the second lens and a center thickness CT2 of the second lens along the optical axis may satisfy: 0<SAG21/CT2<0.7.

According to another aspect, the present disclosure further provides a camera lens assembly. The camera lens assembly includes, sequentially along an optical axis from an object side to an image side, a first lens, a second lens, a third lens, and a fourth lens. An object-side surface of the first lens and an object-side surface of the second lens may both be convex surfaces. An image-side surface of the third lens may be a convex surface. An image-side surface of the fourth lens may be a concave surface. Each of the first lens and the third lens may have a positive refractive power. Each of the second lens and the fourth lens may have a positive refractive power or a negative refractive power. The camera lens assembly may further include an infrared bandpass filter disposed between the fourth lens and an image plane.

In the present disclosure, for example, four lenses are used. By reasonably distributing the refractive powers and the surface types of the lenses, the center thicknesses of the lenses, and the axial spacing distances between the lenses, etc., the lens assembly achieves good imaging quality and has at least one of the beneficial effects such as ultra-thin, miniaturization, low sensitivity, large-aperture, or high brightness.

BRIEF DESCRIPTION OF THE DRAWINGS

By describing non-limiting embodiments below in detail with reference to the accompanying drawings, other features, objectives and advantages of the present disclosure will be more apparent. In the accompanying drawings:

FIG. 1 is a schematic structural diagram illustrating a camera lens assembly according to a first embodiment of the present disclosure;

FIGS. 2A-2E respectively illustrate a longitudinal aberration curve, an astigmatic curve, a distortion curve, a lateral color curve, and a relative illumination curve of the camera lens assembly according to the first embodiment;

FIGS. 4A-4E respectively illustrate a longitudinal aberration curve, an astigmatic curve, a distortion curve, a lateral color curve, and a relative illumination curve of the camera lens assembly according to the second embodiment;

FIG. 5 is a schematic structural diagram illustrating a camera lens assembly according to a third embodiment of the present disclosure;

FIGS. 6A-6E respectively illustrate a longitudinal aberration curve, an astigmatic curve, a distortion curve, a lateral color curve, and a relative illumination curve of the camera lens assembly according to the third embodiment;

FIGS. 8A-8E respectively illustrate a longitudinal aberration curve, an astigmatic curve, a distortion curve, a lateral color curve, and a relative illumination curve of the camera lens assembly according to the fourth embodiment;

FIG. 9 is a schematic structural diagram illustrating a camera lens assembly according to a fifth embodiment of the present disclosure;

FIGS. 10A-10E respectively illustrate a longitudinal aberration curve, an astigmatic curve, a distortion curve, a lateral color curve, and a relative illumination curve of the camera lens assembly according to the fifth embodiment;

FIGS. 12A-12E respectively illustrate a longitudinal aberration curve, an astigmatic curve, a distortion curve, a lateral color curve, and a relative illumination curve of the camera lens assembly according to the sixth embodiment;

FIGS. 14A-14E respectively illustrate a longitudinal aberration curve, an astigmatic curve, a distortion curve, a lateral color curve, and a relative illumination curve of the camera lens assembly according to the seventh embodiment.

DETAILED DESCRIPTION

Figure 2D:
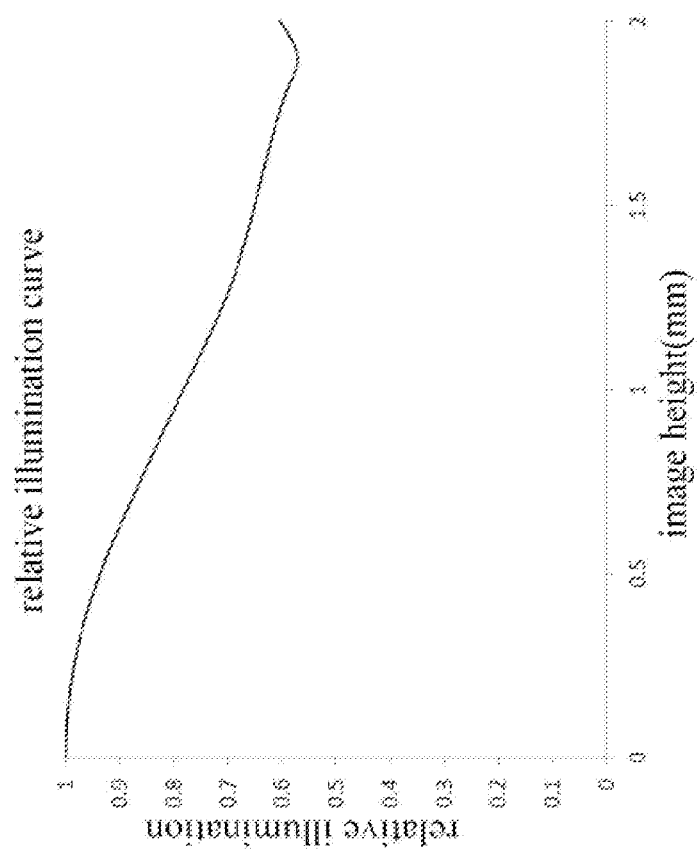

For better understanding the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any one and all combinations of one or more of the associated listed items.

It should be noted that in the specification, the expressions such as "first," "second" and "third" are only used to distinguish one feature from another, rather than represent any limitations to the features. Thus, the first lens discussed below may alternatively be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces are shown in the accompanying drawings as examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens has a convex surface and a position of the convex surface is not defined, at least the portion of the surface of the lens in the paraxial area is the convex surface; and if the surface of the lens has a concave surface and a position of the concave surface is not defined, at least the portion of the surface of the lens in the paraxial area is the concave surface. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

The camera lens assembly according to exemplary implementations of the present disclosure includes, for example, four lenses (i.e., a first lens, a second lens, a third lens, and a fourth lens) having refractive powers. The four lenses are arranged in sequence along an optical axis from an object side to an image side.

The camera lens assembly may further include a photosensitive element disposed on an image plane, and a half of a diagonal length of an effective pixel area of the photosensitive element is ImgH.

The first lens may have a positive refractive power, which has a large dioptric power and is conductive to shortening the total track length of the lens assembly and reducing the size of the lens assembly. An object-side surface of the first lens may be a convex surface. A radius R1 of curvature of the object-side surface of the first lens and a total effective focal length f of the camera lens assembly may satisfy: $0.5<R1/f<1.2$, and more specifically, R1 and f may further satisfy: $0.58 \leq R1/f \leq 0.74$. Satisfying the conditional expression $0.5<R1/f<1.2$ is conductive to shortening the total track length of the system, and increasing the amount of lights entering the system so as to improve the intensity of infrared lights reaching the image plane.

The second lens has a positive refractive power or a negative refractive power, and an object-side surface of the second lens may be a convex surface, which is conductive to balancing off-axis aberrations and improving the imaging quality. Alternatively, the second lens may have a positive refractive power. An effective focal length f2 of the second lens and the total effective focal length f of the camera lens assembly may satisfy: $2<f2/f<8$, and more specifically, f2 and f may further satisfy: $2.39 \leq f2/f \leq 7.19$. Satisfying the conditional expression $2<f2/f<8$ is conductive to balancing the refractive power and the aberration of the system, and shortening the total track length of the system.

Alternatively, the object-side surface of the second lens may be a convex surface, and the image-side surface of the second lens may be a concave surface. A radius R3 of curvature of the object-side surface of the second lens and a radius R4 of curvature of the image-side surface of the second lens may satisfy: $0.5<R3/R4<1$, and more specifically, R3 and R4 may further satisfy: $0.65 \leq R3/R4 \leq 0.85$. Satisfying the conditional expression $0.5<R3/R4<1$ is conductive to dispersing the refractive power of the first lens, thereby avoiding the excessive bending of the surface of the first lens and large difficulty in manufacturing caused by the recessive concentration of the refractive power. In addition, satisfying the conditional expression $0.5<R3/R4<1$ is also conductive to increasing the amount of lights entering the system.

The third lens may have a positive refractive power, and an image-side surface of the third lens may be a convex surface. Such an arrangement facilitates the dispersion of the refractive power, so that an angle between lights of the off-axis field and the optical axis may be reduced, thereby improving the astigmatism of the off-axis field.

The fourth lens has a positive power or a negative power, and an image-side surface of the fourth lens is a concave surface. Such an arrangement helps the image plane to approach the object side, thereby shortening the total track length of the system and achieving miniaturization. Alternatively, at least one of the object-side surface of the fourth lens or the image-side surface of the fourth lens has at least one inflection point. When the object-side surface of the fourth lens or the image-side surface of the fourth lens has at least one inflection point, the optical path of the off-axis field may be adjusted to reduce the surface incident angle of the off-axis field. in addition, the comatic aberrations and the astigmatism of the off-axis field may be reduced.

In the application, the center thicknesses of the lenses and the distances between the lenses may be optimized to achieve better optical performances of the camera lens assembly.

A center thickness CT1 of the first lens along the optical axis and a center thickness CT3 of the third lens along the optical axis may satisfy: $0.6<CT1/CT3<1.3$, and more specifically, CT1 and CT3 may further satisfy: $0.67 \leq CT1/CT3 \leq 1.24$. Satisfying the conditional expression $0.6<CT1/CT3<1.3$ is conductive to dispersing the refractive powers of the system, to keep the refractive powers from being overly concentrated on the first lens or the third lens, so as to avoid problems such as the tolerance sensitivity, the excessive curve of the surface of the lens, and the difficulty in shaping, which are caused by the excessive concentration of the refractive powers.

The center thickness CT1 of the first lens along the optical axis, a center thickness CT2 of the second lens along the optical axis, and the center thickness CT3 of the third lens along the optical axis may satisfy: $0.4<CT1/(CT2+CT3)<0.9$, and more specifically, CT1, CT2, and CT3 may further satisfy: $0.43 \leq CT1/(CT2+CT3) \leq 0.73$. Satisfying the conditional expression $0.4<CT1/(CT2+CT3)<0.9$ helps the first lens, the second lens and the third lens to obtain a reasonable spatial layout, thereby facilitating the dispersion of the refractive powers of the system and the shaping and processing of the lenses.

A sum ΣCT of the center thicknesses along the optical axis regarding all lenses (in a case that the camera lens assembly includes four lenses having refractive powers, all lenses having refractive powers are the first lens, the second lens, the third lens, and the fourth lens) having refractive powers in the camera lens assembly, and the total track length TTL (i.e., the axial distance from the center of the object-side surface of the first lens to the image plane) of the camera lens assembly may satisfy: $\Sigma CT/TTL<0.6$, and more specifically, ΣCT and TTL may further satisfy: $0.46 \leq \Sigma CT/TTL \leq 0.51$. Satisfying the conditional expression $\Sigma CT/TTL<0.6$ is conductive to shortening the total track length of the lens assembly. In addition, increasing the distances between the lenses is also conductive to reducing the tolerance sensitivity of the system, thereby improving the quality and the consistency of the mass-produced lens assemblies.

The spacing distance T12 along the optical axis between the first lens and the second lens and the total track length TTL of the camera lens assembly may satisfy: $T12/TTL<0.2$, and more specifically, T12 and TTL may further satisfy: $0.06 \leq T12/TTL \leq 0.16$. Satisfying the conditional expression $T12/TTL<0.2$ is conductive to compressing the effective diameter of the second lens, and reducing the size of the lens assembly, thereby achieving miniaturization characteristics.

An effective semi-diameter DT11 of the object-side surface of the first lens and the half ImgH of the diagonal length of the effective pixel area on the image plane may satisfy: $0.5<DT11/ImgH<1$, and more specifically, DT11 and ImgH may further satisfy: $0.52 \leq DT11/ImgH \leq 0.63$. Satisfying the conditional expression $0.5<DT11/ImgH<1$ is conductive to shortening the total track length of the lens assembly and allowing a large amount of lights to enter the system to improve the signal-to-noise ratio of the output signal of the photosensitive element.

An effective semi-diameter DT42 of an image-side surface of the fourth lens and the half ImgH of the diagonal length of the effective pixel area on the image plane may satisfy: $0.7<DT42/ImgH<1$, and more specifically, DT42 and ImgH may further satisfy: $0.83 \leq DT42/ImgH \leq 0.99$. Satisfying the conditional expression $0.7<DT42/ImgH<1$ may avoid the tolerance sensitivity generated due to sharply inclining off-axis lights passing through the fourth lens. In addition, such an arrangement is also conductive to the miniaturization of the lens assembly.

An axial distance SAG21 from an intersection point of the object-side surface of the second lens with the optical axis to a vertex of an effective semi-diameter of the object-side surface of the second lens and the center thickness CT2 of the second lens along the optical axis may satisfy: $0<SAG21/CT2<0.7$, and more specifically, SAG21 and CT2 may further satisfy: $0.15 \leq SAG21/CT2 \leq 0.60$. Satisfying the conditional expression $0<SAG21/CT2<0.7$ is conductive to reducing the effective diameter of the second lens, thereby facilitating the processing and shaping of the lens.

The total effective focal length f of the camera lens assembly and an entrance pupil diameter EPD of the camera lens assembly may satisfy: $f/EPD<1.5$, and more specifically, f and EPD may further satisfy: $1.04 \leq f/EPD \leq 1.29$. Satisfying the conditional expression $f/EPD<1.5$ can effectively enhance the energy density on the image plane, which is conductive to improving the signal-to-noise ratio of the output signal of an image-side sensor.

Alternatively, an infrared bandpass filter may be disposed between the fourth lens and the image plane, to filter passing infrared lights, thus eliminating chromatic aberration and blurred image caused by non-infrared lights. That is, the signal interference caused by the non-infrared lights is eliminated.

In the exemplary implementations, the camera lens assembly may further include at least one diaphragm. The diaphragm may be disposed at any position between the object side and the image side as needed. By properly selecting the position of the diaphragm, aberrations (e.g., comatic aberrations, astigmatism, distortions, and lateral color aberrations) related to the diaphragm can effectively be corrected, to improve the imaging quality of the lens assembly. Alternatively, the diaphragm may be disposed between the object side and the first lens. Alternatively, the diaphragm may be disposed between the first lens and the second lens.

Alternatively, the camera lens assembly may further include a protective glass for protecting the photosensitive element on the image plane.

The camera lens assembly according to the above implementations of the present disclosure may use multiple lenses, for example, four lenses described above. By reasonably arranging the refractive powers and the surface types of the lenses, the center thicknesses of the lenses, the axial distances between the lenses, etc., the size of the lens assembly may be effectively reduced, the sensitivity of the lens assembly may be effectively reduced, and the processability of the lens assembly may be effectively improved, thus making the camera lens assembly more conducive to the production and processing and applicable to the portable electronic products. Meanwhile, the camera lens assembly with the above configuration may further have beneficial effects such as ultra-thin, large-aperture, high brightness, and high imaging quality.

In the implementations of the present disclosure, at least one of the surfaces of the lenses is an aspheric surface. The aspheric lens is characterized in that the curvature continuously changes from the center to the periphery of the lens. Different from a spherical lens having a constant curvature from the center to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. In addition, the use of the aspheric lens may also effectively reduce the number of lenses in the optical system.

However, it should be understood by those skilled in the art that the various results and advantages described in the present specification may be obtained by changing the number of the lenses constituting the camera lens assembly without departing from the technical solution claimed by the present disclosure. For example, although the camera lens assembly having four lenses is described as an example in the implementations, the camera lens assembly is not limited to include four lenses. If desired, the camera lens assembly may also include other numbers of lenses.

Specific embodiments of the camera lens assembly that may be applied to the above implementations are further described below with reference to the accompanying drawings.

First Embodiment

A camera lens assembly according to a first embodiment of the present disclosure is described below with reference to FIGS. 1-2E. FIG. 1 is a schematic structural diagram illustrating the camera lens assembly according to the first embodiment of the present disclosure.

As shown in FIG. 1, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

The fourth lens L4 has a positive refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the object side and the first lens L1, to improve the imaging quality of the camera lens assembly.

Table 1 shows the surface type, the radius of curvature, the thickness, the material and the conic coefficient of each lens of the camera lens assembly in the first embodiment. The units of the radius of curvature and the thickness are both millimeters (mm).

TABLE 1

| surface number | surface type | radius of curvature | thickness | material refractive index | abbe number | conic coefficient |
|---|---|---|---|---|---|---|
| OBJ | spherical | infinite | 400.0000 | | | |
| STO | spherical | infinite | −0.2950 | | | |
| S1 | aspheric | 1.9945 | 0.5640 | 1.64 | 20.4 | −0.9393 |
| S2 | aspheric | 2.1702 | 0.2525 | | | −13.6306 |
| S3 | aspheric | 1.2678 | 0.3884 | 1.53 | 55.8 | −0.3230 |
| S4 | aspheric | 1.7386 | 0.6697 | | | −0.0276 |
| S5 | aspheric | −6.2926 | 0.6907 | 1.53 | 55.8 | 0.0000 |
| S6 | aspheric | −1.7271 | 0.0500 | | | −6.9781 |
| S7 | aspheric | 0.8558 | 0.3701 | 1.53 | 55.8 | −7.0909 |
| S8 | aspheric | 0.7349 | 0.5072 | | | −2.9313 |
| S9 | spherical | infinite | 0.2100 | 1.52 | 64.2 | |
| S10 | spherical | infinite | 0.5000 | | | |
| S11 | spherical | infinite | | | | |

As may be obtained from Table 1, the radius R3 of curvature of the object-side surface S3 of the second lens L2 and the radius R4 of curvature of the image-side surface S4 of the second lens L2 satisfy: R3/R4=0.73. The center thickness CT1 of the first lens L1 along the optical axis and the center thickness CT3 of the third lens L3 along the optical axis satisfy: CT1/CT3=0.82. The center thickness CT1 of the first lens L1 along the optical axis, the center thickness CT2 of the second lens L2 along the optical axis, and the center thickness CT3 of the third lens L3 along the optical axis satisfy: CT1/(CT2+CT3)=0.52.

In the first embodiment, each lens may be an aspheric lens, and the surface type x of each aspheric surface is defined by the following formula:

$$x = \frac{ch^2}{1+\sqrt{1-(k+1)c^2h^2}} + \sum A_i h^i. \quad (1)$$

Here, x is the sag of the displacement of the aspheric surface from the vertex of the aspheric surface, when the surface is at distance h from the optical axis; c is the paraxial curvature of the aspheric surface, and c=1/R (i.e., the paraxial curvature c is the reciprocal of the radius R of curvature in Table 1 above); k is the conic coefficient (given in Table 1); and Ai is the $i^{th}$ order correction coefficient of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S8 in the first embodiment.

TABLE 2

| surface number | A4 | A6 | A8 | A10 | A12 | A14 | A16 |
|---|---|---|---|---|---|---|---|
| S1 | −2.6901E−02 | 1.3274E−02 | −2.1706E−02 | 2.5702E−02 | −1.9823E−02 | 4.9245E−03 | −1.0617E−04 |
| S2 | −4.2572E−02 | −3.0394E−02 | 1.0206E−02 | 1.1631E−02 | −1.5978E−02 | 4.9360E−03 | 1.8444E−04 |
| S3 | −1.8404E−01 | −2.2932E−02 | −1.9112E−01 | 1.8354E−01 | −4.8139E−02 | 1.0335E−03 | 4.3675E−04 |
| S4 | 2.3637E−02 | −1.3993E−01 | −1.5439E−01 | 2.7901E−01 | −1.6071E−01 | 3.9760E−02 | −3.2453E−03 |
| S5 | 1.8305E−01 | −3.5807E−01 | 4.7080E−01 | −4.3425E−01 | 2.4972E−01 | −8.9144E−02 | 1.4350E−02 |
| S6 | −4.8618E−01 | 1.2078E+00 | −1.8554E+00 | 1.7025E+00 | −9.0795E−01 | 2.5477E−01 | −2.8524E−02 |
| S7 | −3.3394E−02 | −5.2685E−02 | 4.0756E−02 | −1.1570E−02 | 1.6497E−03 | −1.1853E−04 | 3.2993E−06 |
| S8 | −1.3131E−01 | 7.0132E−02 | −3.0786E−02 | 8.3243E−03 | −1.2222E−03 | 8.6139E−05 | −2.3107E−06 |

Table 3 below shows the total effective focal length f of the camera lens assembly in the first embodiment, the effective focal lengths f1-f4 of the lenses, the half ImgH of the diagonal length of the effective pixel area on the image plane S11 of the camera lens assembly, and the total track length TTL of the camera lens assembly (i.e., the axial distance from the center of the object-side surface S1 of the first lens L1 to the image plane S11).

TABLE 3

| | parameter | | | | | | |
|---|---|---|---|---|---|---|---|
| | f (mm) | f1 (mm) | f2 (mm) | f3 (mm) | f4 (mm) | ImgH (mm) | TTL (mm) |
| numerical value | 2.70 | 17.18 | 6.91 | 4.29 | 173.12 | 2.00 | 4.20 |

As may be obtained from Tables 1 and 3, the effective focal length f2 of the second lens L2 and the total effective focal length f of the camera lens assembly satisfy: f2/f=2.56. The radius R1 of curvature of the object-side surface S1 of the first lens L1 and the total effective focal length f of the camera lens assembly satisfy: R1/f=0.74. The spacing distance T12 along the optical axis between the first lens L1 and the second lens L2 and the total track length TTL of the camera lens assembly satisfy: T12/TTL=0.06. The sum ΣCT of the center thickness of the first lens L1 along the optical axis, the center thickness of the second lens L2 along the optical axis, the center thickness of the third lens L3 along the optical axis, and the center thickness of the fourth lens L4 along the optical axis, and the total track length TTL of the camera lens assembly satisfy: ΣCT/TTL=0.48.

In the first embodiment, the total effective focal length f of the camera lens assembly and the entrance pupil diameter EPD of the camera lens assembly satisfy: f/EPD=1.12. The effective semi-diameter DT11 of the object-side surface S1 of the first lens L1 and the half ImgH of the diagonal length of the effective pixel area on the image plane S11 of the camera lens assembly satisfy: DT11/ImgH=0.61. The effective semi-diameter DT42 of the image-side surface S8 of the fourth lens L4 and the half ImgH of the diagonal length of the effective pixel area on the image plane S11 of the camera lens assembly satisfy: DT42/ImgH=0.99. The distance SAG21 along the optical axis from the intersection point of the object-side surface S3 of the second lens L2 with the optical axis to the vertex of the effective semi-diameter of the object-side surface S3 of the second lens L2 and the center thickness CT2 of the second lens L2 along the optical axis satisfy: SAG21/CT2=0.45.

Figure 2E:
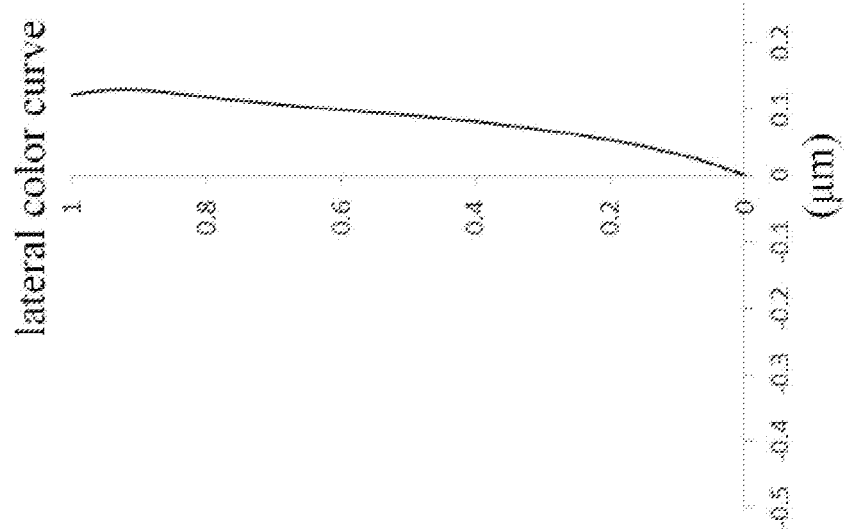

FIG. 2A illustrates the longitudinal aberration curve of the camera lens assembly according to the first embodiment, representing deviations of focal points where lights of different wavelengths converge after passing through the lens assembly. FIG. 2B illustrates the astigmatic curve of the camera lens assembly according to the first embodiment, representing a curvature of the tangential image plane and a curvature of the sagittal image plane. FIG. 2C illustrates the distortion curve of the camera lens assembly according to the first embodiment, representing degrees of distortion at different viewing angles. FIG. 2D illustrates the lateral color curve of the camera lens assembly according to the first embodiment, representing deviations of different heights of images formed by lights passing through the lens assembly and located on the image plane. FIG. 2E illustrates the relative illumination curve of the camera lens assembly according to the first embodiment, representing relative illuminations corresponding to image heights on the image plane. It can be seen from FIGS. 2A-2E that the camera lens assembly according to the first embodiment can achieve a good imaging quality.

Second Embodiment

Figure 3:
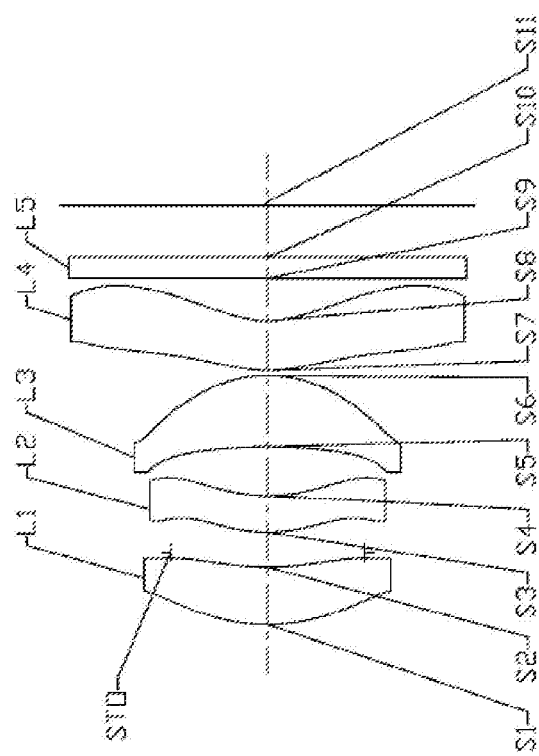
FIG. 3 is a schematic structural diagram illustrating a camera lens assembly according to a second embodiment of the present disclosure.

A camera lens assembly according to a second embodiment of the present disclosure is described below with reference to FIGS. 3-4E. In this embodiment and the following embodiments, for the purpose of brevity, similar descriptions to the first embodiment may be omitted. FIG. 3 is a schematic structural diagram illustrating the camera lens assembly according to the second embodiment of the present disclosure.

As shown in FIG. 3, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the first lens L1 and the second lens L2, to improve the imaging quality of the camera lens assembly.

Table 4 shows the surface type, the radius of curvature, the thickness, the material and the conic coefficient of each lens of the camera lens assembly in the second embodiment. The units of the radius of curvature and the thickness are both millimeters (mm). Table 5 shows the high-order coefficients applicable to each aspheric surface in the second embodiment. The surface type of each aspheric surface may be defined by the formula (1) given in the first embodiment. Table 6 shows the total effective focal length f of the camera lens assembly in the second embodiment, the effective focal lengths f1-f4 of the lenses, the half ImgH of the diagonal length of the effective pixel area on the image plane of the camera lens assembly, and the total track length TTL of the camera lens assembly.

TABLE 4

| surface number | surface type | radius of curvature | thickness | material refractive index | abbe number | conic coefficient |
|---|---|---|---|---|---|---|
| OBJ | spherical | infinite | 400.0000 | | | |
| S1 | aspheric | 1.9129 | 0.5728 | 1.64 | 20.4 | −0.7278 |
| S2 | aspheric | 2.6349 | 0.1459 | | | −13.4891 |
| STO | spherical | infinite | 0.2029 | | | |
| S3 | aspheric | 1.4919 | 0.3674 | 1.53 | 55.8 | 0.3642 |
| S4 | aspheric | 1.7577 | 0.4898 | | | −0.0161 |
| S5 | aspheric | −4.4907 | 0.7150 | 1.53 | 55.8 | 0.0000 |
| S6 | aspheric | −1.5355 | 0.0500 | | | −6.3452 |
| S7 | aspheric | 1.1807 | 0.4987 | 1.53 | 55.8 | −15.9809 |
| S8 | aspheric | 0.9786 | 0.4253 | | | −4.3038 |
| S9 | spherical | infinite | 0.2100 | 1.52 | 64.2 | |
| S10 | spherical | infinite | 0.5223 | | | |
| S11 | spherical | infinite | | | | |

TABLE 5

| surface number | A4 | A6 | A8 | A10 | A12 | A14 | A16 |
|---|---|---|---|---|---|---|---|
| S1 | −2.0938E−02 | 7.1645E−03 | −1.2217E−02 | 1.5627E−02 | −1.8137E−02 | 8.1936E−03 | −1.5442E−03 |
| S2 | −3.7195E−02 | −2.5868E−03 | −2.0882E−02 | 8.3370E−03 | 6.8312E−03 | −7.9328E−03 | 2.2755E−03 |
| S3 | −1.7076E−01 | −8.0125E−02 | −1.5436E−01 | 1.9385E−01 | −7.2746E−02 | −2.3434E−02 | 2.2857E−02 |
| S4 | −6.5556E−03 | −1.2073E−01 | −1.5830E−01 | 3.0988E−01 | −1.9283E−01 | 3.1055E−02 | 6.8774E−03 |
| S5 | 1.2179E−01 | −3.3096E−01 | 4.7612E−01 | −4.4101E−01 | 2.3203E−01 | −7.9559E−02 | 1.5354E−02 |
| S6 | −6.3654E−01 | 1.5927E+00 | −2.7276E+00 | 2.8992E+00 | −1.8471E+00 | 6.3927E−01 | −9.0844E−02 |
| S7 | −3.9350E−02 | −1.9082E−03 | 1.0826E−02 | −3.9619E−03 | 6.4006E−04 | −4.8389E−05 | 1.3687E−06 |
| S8 | −8.5153E−02 | 3.7287E−02 | −1.2320E−02 | 1.9163E−03 | −1.0815E−04 | 0.0000E+00 | 0.0000E+00 |

TABLE 6

| | parameter | | | | | | |
|---|---|---|---|---|---|---|---|
| | f (mm) | f1 (mm) | f2 (mm) | f3 (mm) | f4 (mm) | ImgH (mm) | TTL (mm) |
| numerical value | 2.70 | 8.37 | 12.66 | 4.08 | −73.18 | 2.07 | 4.20 |

Figure 4A:
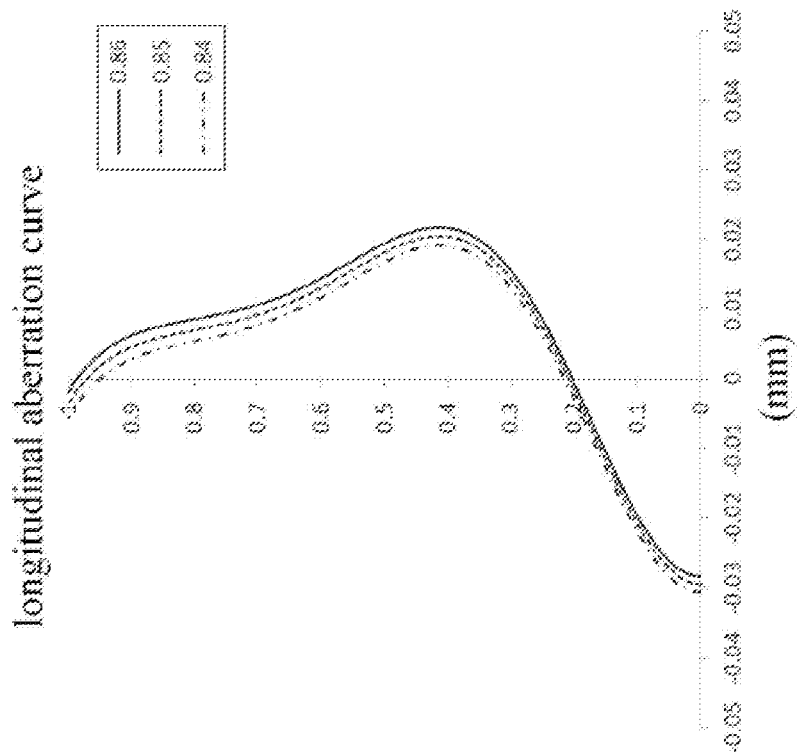
Figures 4D, 4E:
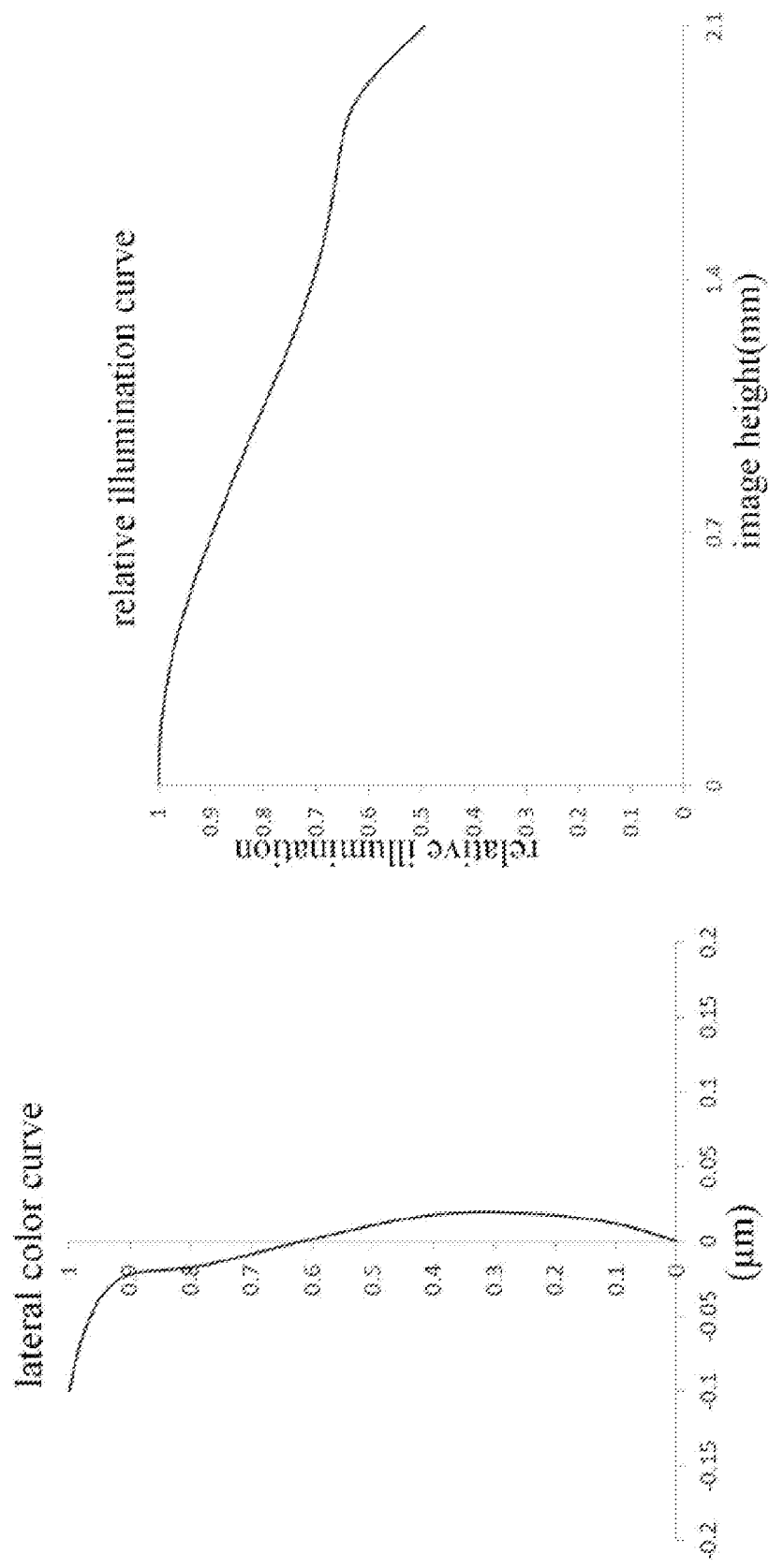

FIG. 4A illustrates the longitudinal aberration curve of the camera lens assembly according to the second embodiment, representing deviations of focal points where lights of different wavelengths converge after passing through the lens assembly. FIG. 4B illustrates the astigmatic curve of the camera lens assembly according to the second embodiment, representing a curvature of the tangential image plane and a curvature of the sagittal image plane. FIG. 4C illustrates the distortion curve of the camera lens assembly according to the second embodiment, representing degrees of distortion at different viewing angles. FIG. 4D illustrates the lateral color curve of the camera lens assembly according to the second embodiment, representing deviations of different heights of images formed by lights passing through the lens assembly and located on the image plane. FIG. 4E illustrates the relative illumination curve of the camera lens assembly according to the second embodiment, representing relative illuminations corresponding to image heights on the image plane. It can be seen from FIGS. 4A-4E that the camera lens assembly according to the second embodiment can achieve a good imaging quality.

Third Embodiment

Figures 5, 6A:
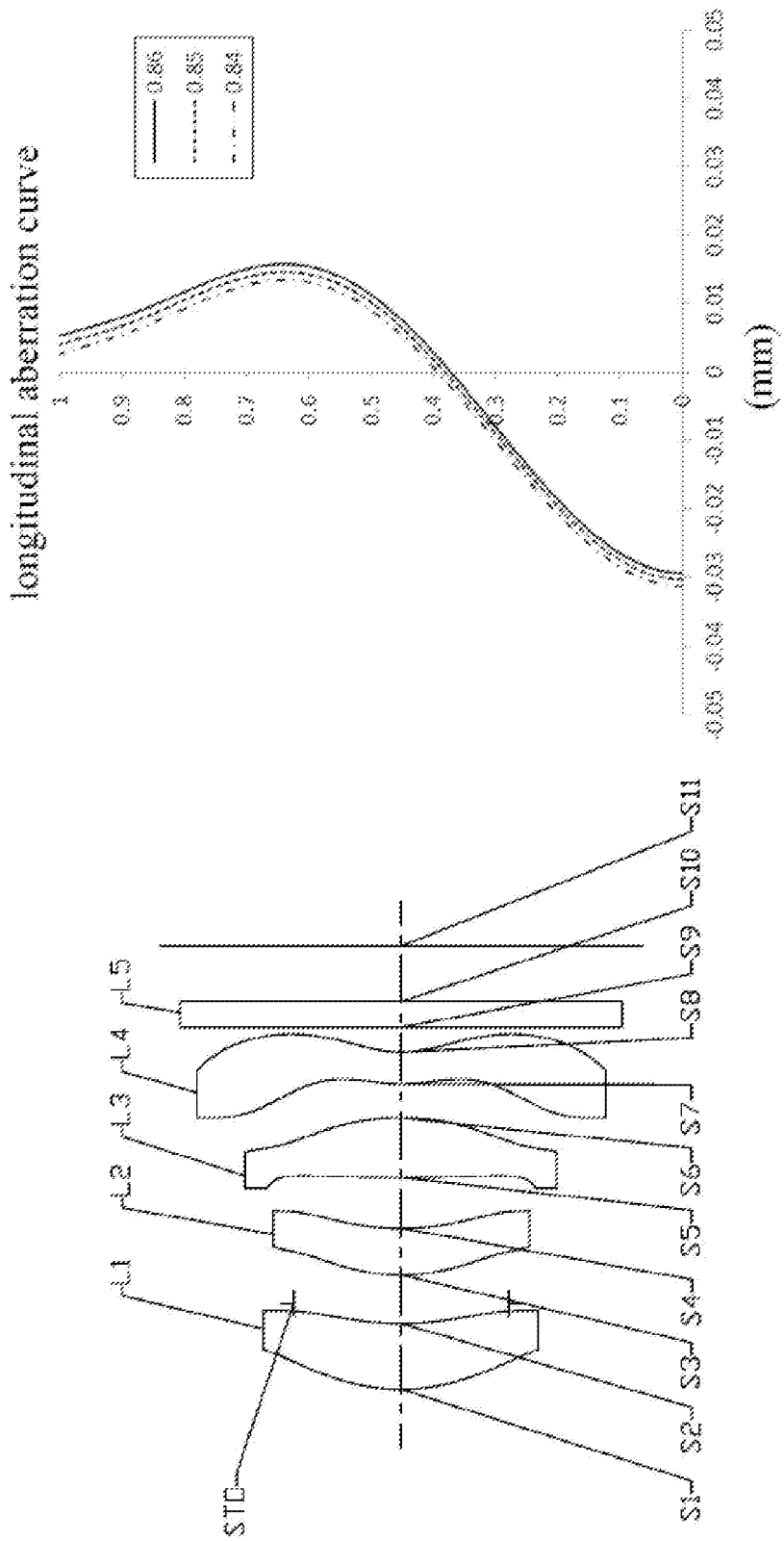

A camera lens assembly according to a third embodiment of the present disclosure is described below with reference to FIGS. 5-6E. FIG. 5 is a schematic structural diagram illustrating the camera lens assembly according to the third embodiment of the present disclosure.

As shown in FIG. 5, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the first lens L1 and the second lens L2, to improve the imaging quality of the camera lens assembly.

Table 7 shows the surface type, the radius of curvature, the thickness, the material and the conic coefficient of each lens of the camera lens assembly in the third embodiment. The units of the radius of curvature and the thickness are both millimeters (mm). Table 8 shows the high-order coefficients applicable to each aspheric surface in the third embodiment. The surface type of each aspheric surface may be defined by the formula (1) given in the first embodiment. Table 9 shows the total effective focal length f of the camera lens assembly in the third embodiment, the effective focal lengths f1-f4 of the lenses, the half ImgH of the diagonal length of the effective pixel area on the image plane of the camera lens assembly, and the total track length TTL of the camera lens assembly.

TABLE 7

| surface number | surface type | radius of curvature | thickness | material refractive index | abbe number | conic coefficient |
|---|---|---|---|---|---|---|
| OBJ | spherical | infinite | 0.0000 | | | |
| S1 | aspheric | 1.5969 | 0.5336 | 1.62 | 23.5 | −0.7354 |
| S2 | aspheric | 2.3046 | 0.1621 | | | −6.3459 |
| STO | spherical | infinite | 0.2317 | | | |
| S3 | aspheric | 1.5219 | 0.3797 | 1.53 | 55.8 | 0.5587 |
| S4 | aspheric | 2.3004 | 0.4121 | | | 3.4656 |
| S5 | aspheric | 17.3641 | 0.4832 | 1.53 | 55.8 | 0.0000 |
| S6 | aspheric | −2.3038 | 0.2762 | | | −0.5370 |
| S7 | aspheric | 1.2824 | 0.2600 | 1.53 | 55.8 | −15.9830 |
| S8 | aspheric | 0.8774 | 0.2014 | | | −5.1778 |
| S9 | spherical | infinite | 0.2100 | 1.52 | 64.2 | |
| S10 | spherical | infinite | 0.4499 | | | |
| S11 | spherical | infinite | | | | |

TABLE 8

| surface number | A4 | A6 | A8 | A10 | A12 | A14 | A16 |
|---|---|---|---|---|---|---|---|
| S1 | −2.4003E−02 | −7.5346E−03 | −6.7209E−03 | 6.0803E−03 | −2.1473E−02 | 1.2364E−02 | −1.7349E−03 |
| S2 | −4.0073E−02 | −2.3053E−02 | −2.7752E−02 | 1.6195E−02 | 3.3039E−03 | −2.7646E−03 | 1.1259E−03 |
| S3 | −1.1578E−01 | −5.0949E−03 | −1.9019E−01 | 1.5170E−01 | −7.7018E−02 | 1.4587E−02 | 2.2859E−02 |
| S4 | 1.3480E−02 | −1.3969E−01 | −9.4474E−02 | 1.8379E−01 | −2.4467E−01 | 1.0573E−01 | 6.9279E−03 |
| S5 | 3.6031E−02 | −1.6504E−01 | 2.2961E−01 | −1.5991E−01 | 8.5202E−02 | −7.9465E−02 | 1.5351E−02 |
| S6 | −2.2493E−01 | 6.6619E−01 | −1.2917E+00 | 1.5860E+00 | −1.0110E+00 | 3.0611E−01 | −3.4677E−02 |
| S7 | −6.3749E−01 | 5.5138E−01 | −4.7617E−01 | 4.1691E−01 | −2.1333E−01 | 5.3312E−02 | −5.1217E−03 |
| S8 | −3.7089E−01 | 3.4114E−01 | −2.2096E−01 | 8.8733E−02 | −1.9355E−02 | 1.5132E−03 | 5.8720E−05 |

TABLE 9

| parameter | | | | | | |
|---|---|---|---|---|---|---|
| f (mm) | f1 (mm) | f2 (mm) | f3 (mm) | f4 (mm) | ImgH (mm) | TTL (mm) |
| numerical value 2.56 | 6.51 | 7.30 | 3.89 | −6.77 | 1.98 | 3.60 |

Figures 6B, 6C:
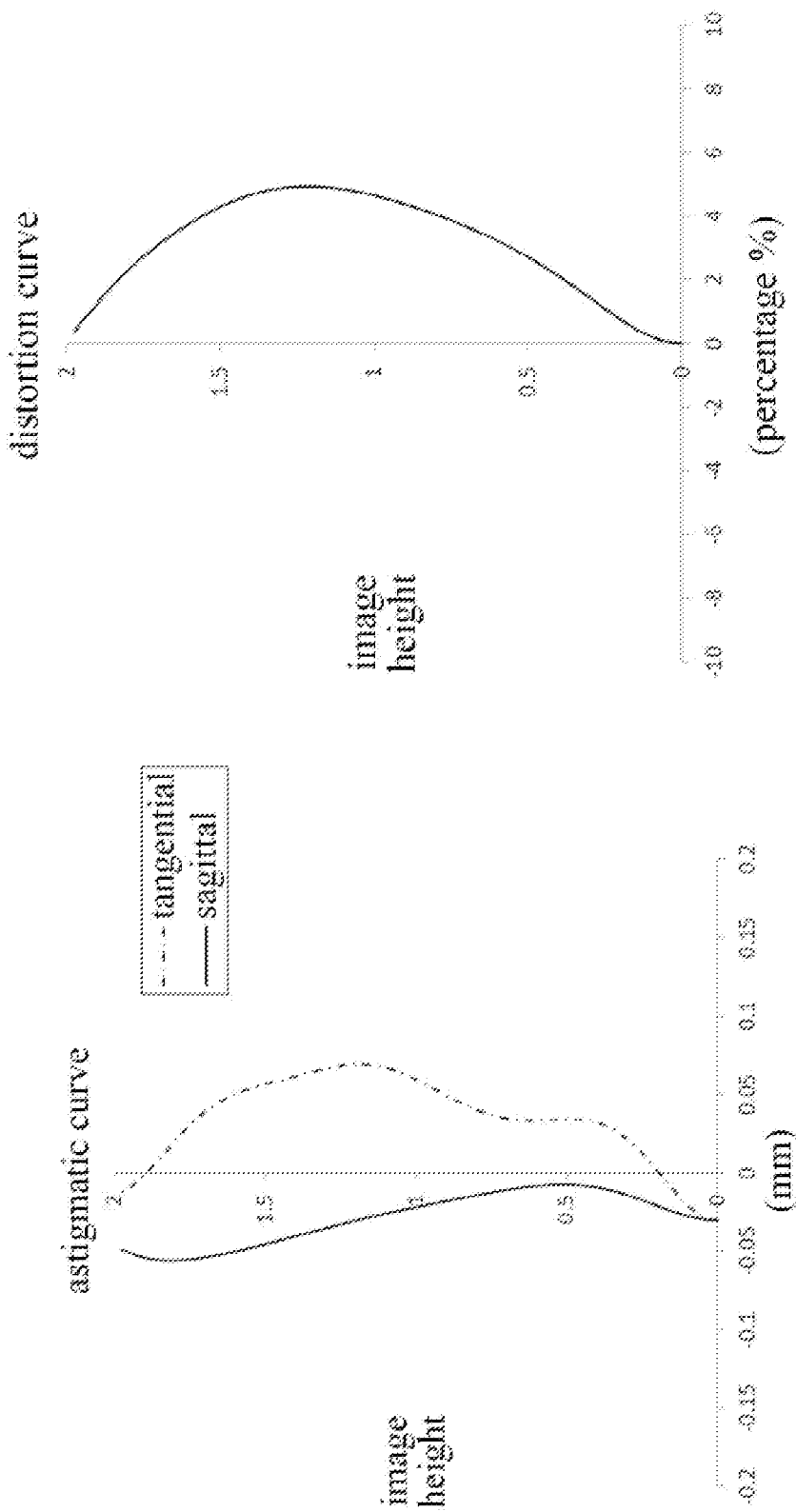

FIG. 6A illustrates the longitudinal aberration curve of the camera lens assembly according to the third embodiment, representing deviations of focal points where lights of different wavelengths converge after passing through the lens assembly. FIG. 6B illustrates the astigmatic curve of the camera lens assembly according to the third embodiment, representing a curvature of the tangential image plane and a curvature of the sagittal image plane. FIG. 6C illustrates the distortion curve of the camera lens assembly according to the third embodiment, representing degrees of distortion at different viewing angles. FIG. 6D illustrates the lateral color curve of the camera lens assembly according to the third embodiment, representing deviations of different heights of images formed by lights passing through the lens assembly and located on the image plane. FIG. 6E illustrates the relative illumination curve of the camera lens assembly according to the third embodiment, representing relative illuminations corresponding to image heights on the image plane. It can be seen from FIGS. 6A-6E that the camera lens assembly according to the third embodiment can achieve a good imaging quality.

Fourth Embodiment

Figure 7:
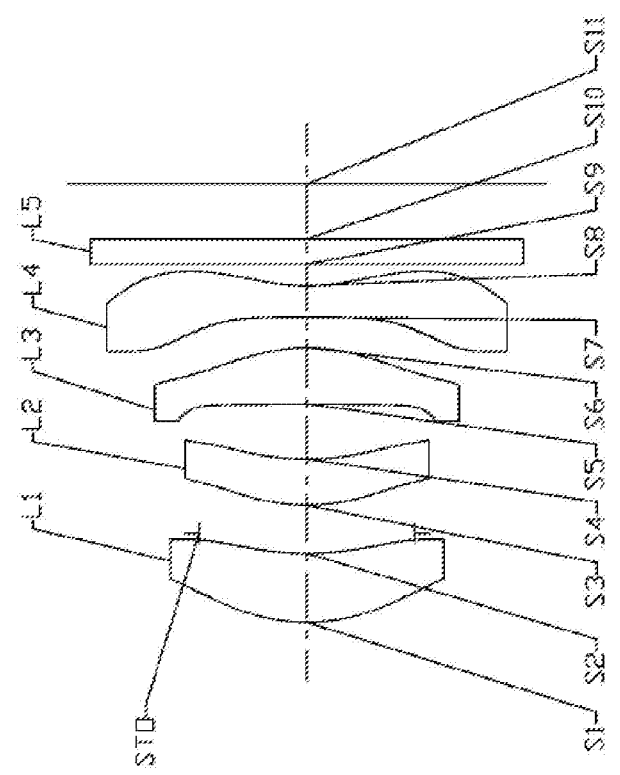
FIG. 7 is a schematic structural diagram illustrating a camera lens assembly according to a fourth embodiment of the present disclosure.

A camera lens assembly according to the fourth embodiment of the present disclosure is described below with reference to FIGS. 7-8E. FIG. 7 is a schematic structural diagram illustrating the camera lens assembly according to the fourth embodiment of the present disclosure.

As shown in FIG. 7, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a concave surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the first lens L1 and the second lens L2, to improve the imaging quality of the camera lens assembly.

Table 10 shows the surface type, the radius of curvature, the thickness, the material and the conic coefficient of each lens of the camera lens assembly in the fourth embodiment. The units of the radius of curvature and the thickness are both millimeters (mm). Table 11 shows the high-order coefficients applicable to each aspheric surface in the fourth embodiment. The surface type of each aspheric surface may be defined by the formula (1) given in the first embodiment. Table 12 shows the total effective focal length f of the camera lens assembly in the fourth embodiment, the effective focal lengths f1-f4 of the lenses, the half ImgH of the diagonal length of the effective pixel area on the image plane of the camera lens assembly, and the total track length TTL of the camera lens assembly.

TABLE 10

| surface number | surface type | radius of curvature | thickness | refractive index | abbe number | conic coefficient |
|---|---|---|---|---|---|---|
| OBJ | spherical | infinite | 400.0000 | | | |
| S1 | aspheric | 1.5288 | 0.5660 | 1.62 | 23.5 | −0.6415 |
| S2 | aspheric | 2.2816 | 0.1659 | | | −5.6703 |
| STO | spherical | infinite | 0.2294 | | | |
| S3 | aspheric | 1.5570 | 0.3804 | 1.53 | 55.8 | 0.7918 |
| S4 | aspheric | 2.4048 | 0.4519 | | | 4.3271 |
| S5 | aspheric | −15.2846 | 0.4630 | 1.53 | 55.8 | 0.0000 |
| S6 | aspheric | −1.2394 | 0.2450 | | | −2.3169 |
| S7 | aspheric | −51.6031 | 0.2600 | 1.53 | 55.8 | −15.9809 |
| S8 | aspheric | 1.6105 | 0.1784 | | | −5.1955 |
| S9 | spherical | infinite | 0.2100 | 1.52 | 64.2 | |
| S10 | spherical | infinite | 0.4500 | | | |
| S11 | spherical | infinite | | | | |

TABLE 11

| surface number | A4 | A6 | A8 | A10 | A12 | A14 | A16 |
|---|---|---|---|---|---|---|---|
| S1 | −2.0810E−02 | 1.0243E−03 | −1.6939E−02 | 1.0342E−02 | −1.9783E−02 | 8.2773E−03 | −6.2554E−04 |
| S2 | −3.2809E−02 | −2.7210E−02 | −3.3706E−02 | 1.6401E−02 | 4.4599E−03 | −2.2500E−03 | 3.7039E−04 |
| S3 | −1.0678E−01 | −1.8130E−02 | −2.2494E−01 | 1.7703E−01 | −5.5672E−02 | 1.4802E−03 | 2.2862E−02 |
| S4 | 5.7671E−03 | −7.3940E−02 | −2.2723E−01 | 2.0698E−01 | −1.4686E−01 | 6.1850E−02 | 6.9281E−03 |
| S5 | 9.8829E−02 | −2.1919E−01 | 3.0444E−01 | −3.0595E−01 | 1.4302E−01 | −7.9465E−02 | 1.5354E−02 |
| S6 | 4.3080E−01 | −1.3389E+00 | 2.6886E+00 | −3.2470E+00 | 2.3066E+00 | −8.7430E−01 | 1.3442E−01 |
| S7 | −6.1033E−02 | −2.2569E−01 | 8.9914E−02 | 1.5523E−01 | −1.3379E−01 | 3.8682E−02 | −3.9081E−03 |
| S8 | −1.2317E−01 | −1.4640E−02 | 3.8021E−02 | −1.7027E−02 | 2.4742E−03 | 0.0000E+00 | 0.0000E+00 |

TABLE 12

| | parameter | | | | | |
|---|---|---|---|---|---|---|
| | f (mm) | f1 (mm) | f2 (mm) | f3 (mm) | f4 (mm) | ImgH (mm) | TTL (mm) |
| numerical value | 2.65 | 5.80 | 7.25 | 2.53 | −2.96 | 1.98 | 3.60 |

Figure 8A:
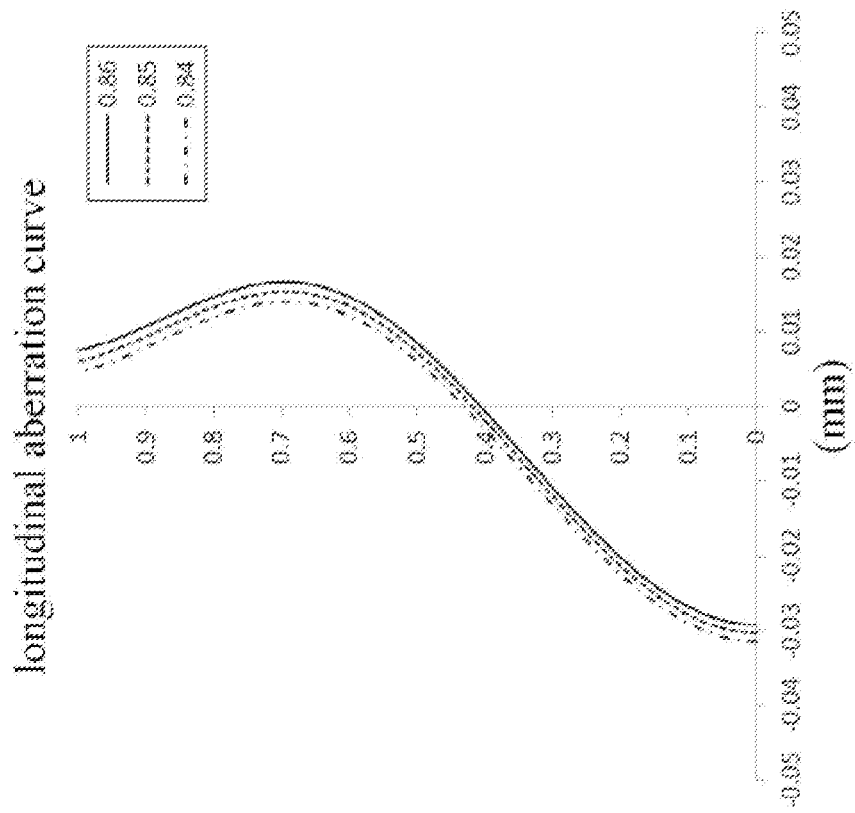

FIG. 8A illustrates the longitudinal aberration curve of the camera lens assembly according to the fourth embodiment, representing deviations of focal points where lights of different wavelengths converge after passing through the lens assembly. FIG. 8B illustrates the astigmatic curve of the camera lens assembly according to the fourth embodiment, representing a curvature of the tangential image plane and a curvature of the sagittal image plane. FIG. 8C illustrates the distortion curve of the camera lens assembly according to the fourth embodiment, representing degrees of distortion at different viewing angles. FIG. 8D illustrates the lateral color curve of the camera lens assembly according to the fourth embodiment, representing deviations of different heights of images formed by lights passing through the lens assembly and located on the image plane. FIG. 8E illustrates the relative illumination curve of the camera lens assembly according to the fourth embodiment, representing relative illuminations corresponding to image heights on the image plane. It can be seen from FIGS. 8A-8E that the camera lens assembly according to the fourth embodiment can achieve a good imaging quality.

Fifth Embodiment

Figures 9, 10A:
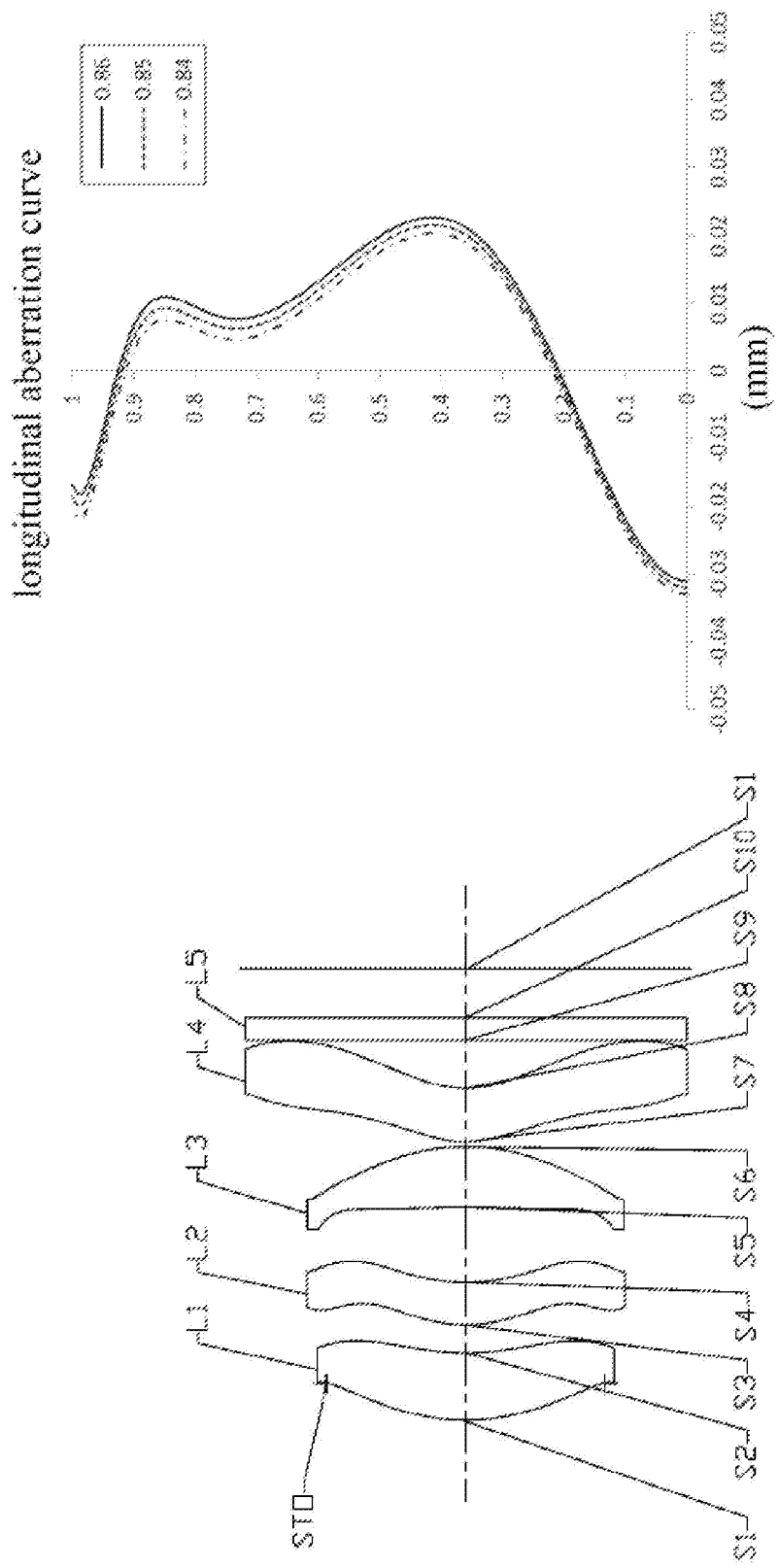

A camera lens assembly according to the fifth embodiment of the present disclosure is described below with reference to FIGS. 9-10E. FIG. 9 is a schematic structural diagram illustrating the camera lens assembly according to the fifth embodiment of the present disclosure.

As shown in FIG. 9, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the object side and the first lens L1, to improve the imaging quality of the camera lens assembly.

Table 13 shows the surface type, the radius of curvature, the thickness, the material and the conic coefficient of each lens of the camera lens assembly in the fifth embodiment. The units of the radius of curvature and the thickness are both millimeters (mm). Table 14 shows the high-order coefficients applicable to each aspheric surface in the fifth embodiment. The surface type of each aspheric surface may be defined by the formula (1) given in the first embodiment. Table 15 shows the total effective focal length f of the camera lens assembly in the fifth embodiment, the effective focal lengths f1-f4 of the lenses, the half ImgH of the diagonal length of the effective pixel area on the image plane of the camera lens assembly, and the total track length TTL of the camera lens assembly.

TABLE 13

| surface number | surface type | radius of curvature | thickness | material refractive index | abbe number | conic coefficient |
|---|---|---|---|---|---|---|
| OBJ | spherical | infinite | 400.0000 | | | |
| STO | spherical | infinite | −0.3400 | | | |
| S1 | aspheric | 1.9887 | 0.6257 | 1.64 | 20.4 | −0.7713 |
| S2 | aspheric | 2.1614 | 0.2595 | | | −12.1989 |
| S3 | aspheric | 1.2922 | 0.3972 | 1.53 | 55.8 | −0.5511 |
| S4 | aspheric | 1.8612 | 0.7011 | | | −0.0464 |
| S5 | aspheric | −5.7028 | 0.5609 | 1.53 | 55.8 | 0.0000 |
| S6 | aspheric | −2.8131 | 0.0500 | | | −8.7644 |
| S7 | aspheric | 0.9254 | 0.4963 | 1.53 | 55.8 | −8.1094 |
| S8 | aspheric | 1.0137 | 0.4493 | | | −1.9765 |
| S9 | spherical | infinite | 0.2100 | 1.52 | 64.2 | |
| S10 | spherical | infinite | 0.4500 | | | |
| S11 | spherical | infinite | | | | |

TABLE 14

| surface number | A4 | A6 | A8 | A10 | A12 | A14 | A16 |
|---|---|---|---|---|---|---|---|
| S1 | −2.3250E−02 | 1.2893E−02 | −2.4007E−02 | 2.7438E−02 | −1.7763E−02 | 4.3274E−03 | −2.7176E−04 |
| S2 | −3.4032E−02 | −2.8793E−02 | 6.9575E−03 | 1.3506E−02 | −1.4905E−02 | 4.8235E−03 | −2.7185E−04 |
| S3 | −1.4642E−01 | −7.2124E−03 | −1.9899E−01 | 1.8037E−01 | −4.8210E−02 | 1.2564E−03 | 7.9764E−04 |
| S4 | 4.1497E−02 | −1.2358E−01 | −1.7354E−01 | 2.7747E−01 | −1.5679E−01 | 4.1506E−02 | −4.2489E−03 |
| S5 | 2.0810E−01 | −3.4503E−01 | 4.5713E−01 | −4.2868E−01 | 2.5249E−01 | −8.7983E−02 | 1.3033E−02 |
| S6 | −5.2762E−01 | 1.2566E+00 | −1.7746E+00 | 1.5308E+00 | −7.7402E−01 | 2.0696E−01 | −2.2267E−02 |
| S7 | 2.5820E−03 | −6.0664E−02 | 3.6590E−02 | −9.2093E−03 | 1.1785E−03 | −7.5594E−05 | 1.8882E−06 |
| S8 | −1.6514E−01 | 8.7381E−02 | −3.3765E−02 | 7.9195E−03 | −1.0446E−03 | 6.8360E−05 | −1.7249E−06 |

TABLE 15

| | parameter | | | | | |
|---|---|---|---|---|---|---|
| | f (mm) | f1 (mm) | f2 (mm) | f3 (mm) | f4 (mm) | ImgH (mm) | TTL (mm) |
| numerical value | 2.70 | 16.20 | 6.46 | 9.86 | 6.85 | 2.08 | 4.20 |

Figures 10B, 10C:
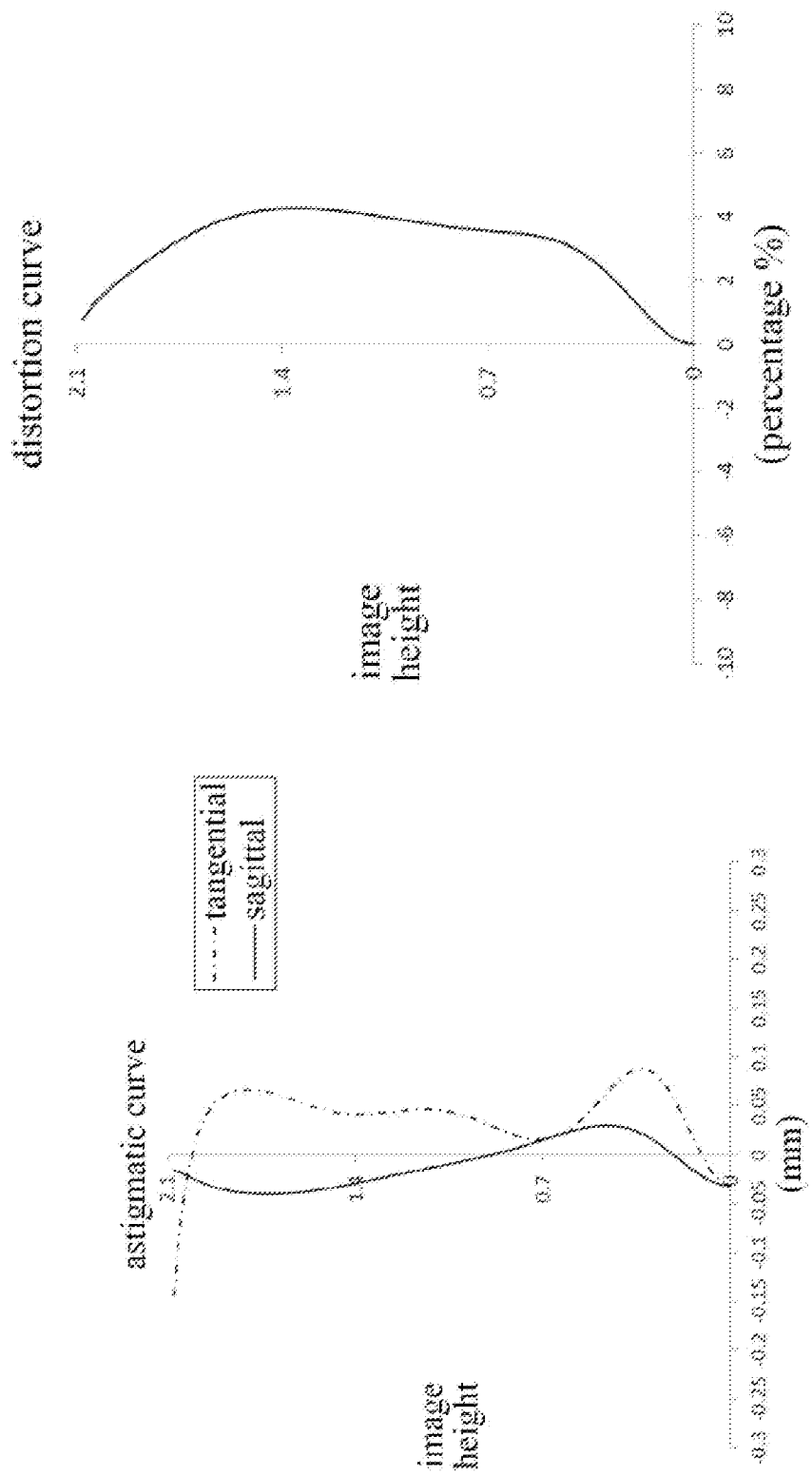

FIG. 10A illustrates the longitudinal aberration curve of the camera lens assembly according to the fifth embodiment, representing deviations of focal points where lights of different wavelengths converge after passing through the lens assembly. FIG. 10B illustrates the astigmatic curve of the camera lens assembly according to the fifth embodiment, representing a curvature of the tangential image plane and a curvature of the sagittal image plane. FIG. 10C illustrates the distortion curve of the camera lens assembly according to the fifth embodiment, representing degrees of distortion at different viewing angles. FIG. 10D illustrates the lateral color curve of the camera lens assembly according to the fifth embodiment, representing deviations of different heights of images formed by lights passing through the lens assembly and located on the image plane. FIG. 10E illustrates the relative illumination curve of the camera lens assembly according to the fifth embodiment, representing relative illuminations corresponding to image heights on the image plane. It can be seen from FIGS. 10A-10E that the camera lens assembly according to the fifth embodiment can achieve a good imaging quality.

Sixth Embodiment

Figure 11:
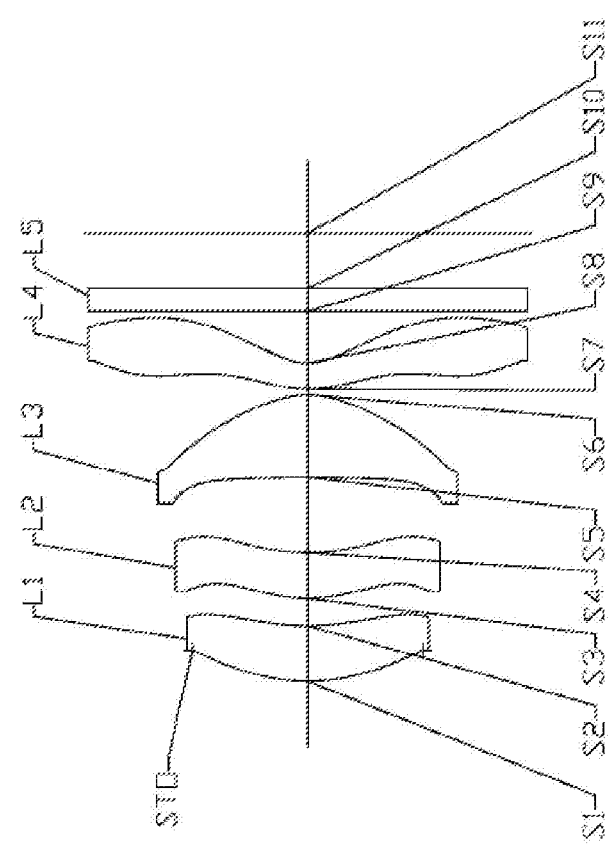
FIG. 11 is a schematic structural diagram illustrating a camera lens assembly according to a sixth embodiment of the present disclosure.

A camera lens assembly according to the sixth embodiment of the present disclosure is described below with reference to FIGS. 11-12E. FIG. 11 is a schematic structural diagram illustrating the camera lens assembly according to the sixth embodiment of the present disclosure.

As shown in FIG. 11, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a concave surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a convex surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the object side and the first lens L1, to improve the imaging quality of the camera lens assembly.

Table 16 shows the surface type, the radius of curvature, the thickness, the material and the conic coefficient of each lens of the camera lens assembly in the sixth embodiment. The units of the radius of curvature and the thickness are both millimeters (mm). Table 17 shows the high-order coefficients applicable to each aspheric surface in the sixth embodiment. The surface type of each aspheric surface may be defined by the formula (1) given in the first embodiment. Table 18 shows the total effective focal length f of the camera lens assembly in the sixth embodiment, the effective focal lengths f1-f4 of the lenses, the half ImgH of the diagonal length of the effective pixel area on the image plane of the camera lens assembly, and the total track length TTL of the camera lens assembly.

TABLE 16

| surface number | surface type | radius of curvature | thickness | material refractive index | abbe number | conic coefficient |
|---|---|---|---|---|---|---|
| OBJ | spherical | infinite | 400.0000 | | | |
| STO | spherical | infinite | −0.2800 | | | |
| S1 | aspheric | 1.8027 | 0.5015 | 1.64 | 20.4 | −0.7587 |
| S2 | aspheric | 2.0987 | 0.2496 | | | −10.5044 |
| S3 | aspheric | 1.4010 | 0.4132 | 1.53 | 55.8 | −0.4203 |
| S4 | aspheric | 1.8778 | 0.6874 | | | −0.4493 |
| S5 | aspheric | −7.9436 | 0.7472 | 1.53 | 55.8 | 0.0000 |
| S6 | aspheric | −0.7093 | 0.0500 | | | −7.7405 |
| S7 | aspheric | 1.0435 | 0.2353 | 1.53 | 55.8 | −6.6155 |
| S8 | aspheric | 0.4543 | 0.4693 | | | −3.5012 |
| S9 | spherical | infinite | 0.2100 | 1.52 | 64.2 | |
| S10 | spherical | infinite | 0.5000 | | | |
| S11 | spherical | infinite | | | | |

TABLE 17

| surface number | A4 | A6 | A8 | A10 | A12 | A14 | A16 |
|---|---|---|---|---|---|---|---|
| S1 | −2.3376E−02 | 1.4573E−02 | −2.2897E−02 | 2.4319E−02 | −2.0369E−02 | 4.9972E−03 | −1.1594E−03 |
| S2 | −4.4366E−02 | −3.2311E−02 | 6.8656E−03 | 7.2142E−03 | −1.8982E−02 | 4.2358E−03 | 2.6175E−03 |
| S3 | −2.0009E−01 | −2.6864E−02 | −1.9719E−01 | 1.8329E−01 | −4.5768E−02 | 3.0644E−03 | 2.6472E−03 |
| S4 | −1.0260E−02 | −1.2812E−01 | −1.4368E−01 | 2.7669E−01 | −1.6475E−01 | 3.8160E−02 | −9.7948E−04 |
| S5 | 1.5229E−01 | −3.5551E−01 | 4.6689E−01 | −4.3870E−01 | 2.4806E−01 | −8.9129E−02 | 1.5086E−02 |
| S6 | −4.0351E−01 | 9.4437E−01 | −1.6404E+00 | 1.7659E+00 | −1.1170E+00 | 3.7355E−01 | −4.9949E−02 |
| S7 | −2.0898E−01 | 6.1476E−02 | 1.8665E−02 | −1.3512E−02 | 3.0181E−03 | −3.0840E−04 | 1.1550E−05 |
| S8 | −1.7771E−01 | 1.0531E−01 | −5.0484E−02 | 1.5890E−02 | −2.7568E−03 | 2.2769E−04 | −7.1017E−06 |

TABLE 18

| | parameter | | | | | |
|---|---|---|---|---|---|---|
| | f (mm) | f1 (mm) | f2 (mm) | f3 (mm) | f4 (mm) | ImgH (mm) | TTL (mm) |
| numerical value | 2.70 | 12.08 | 8.05 | 1.43 | −1.77 | 2.03 | 4.06 |

Figure 12A:
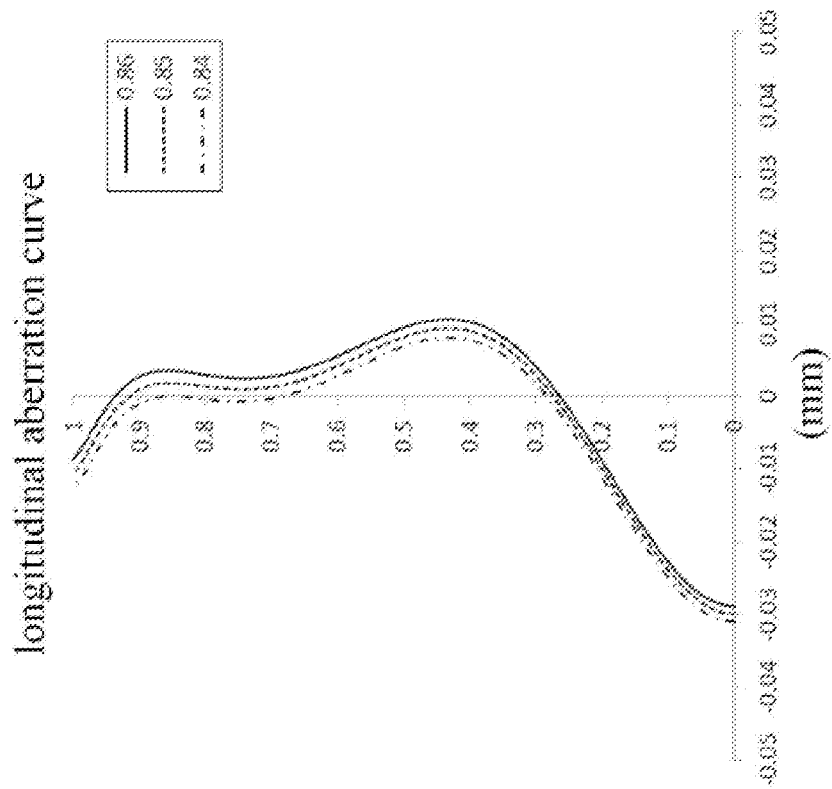
Figures 12D, 12E:
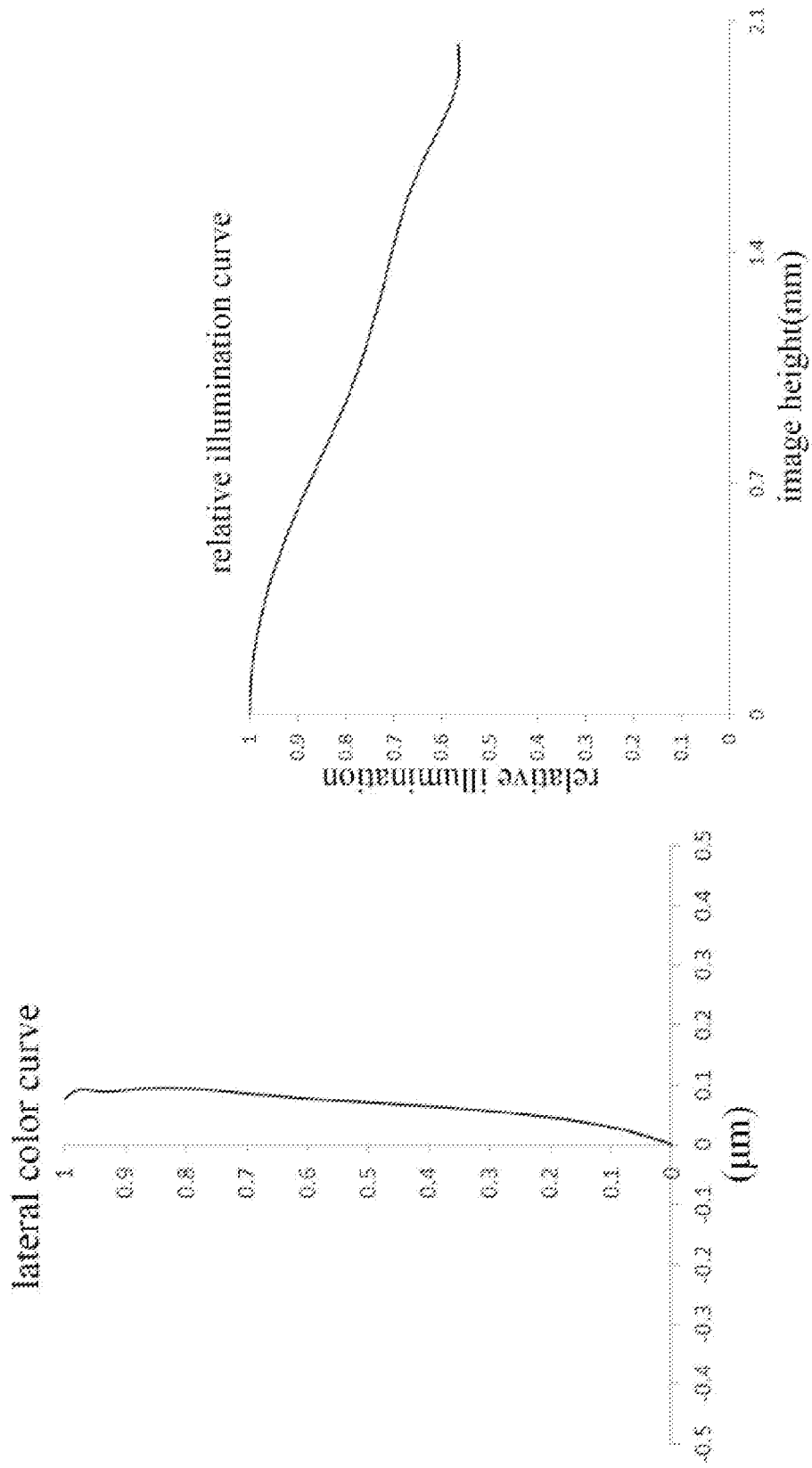

FIG. 12A illustrates the longitudinal aberration curve of the camera lens assembly according to the sixth embodiment, representing deviations of focal points where lights of different wavelengths converge after passing through the lens assembly. FIG. 12B illustrates the astigmatic curve of the camera lens assembly according to the sixth embodiment, representing a curvature of the tangential image plane and a curvature of the sagittal image plane. FIG. 12C illustrates the distortion curve of the camera lens assembly according to the sixth embodiment, representing degrees of distortion at different viewing angles. FIG. 12D illustrates the lateral color curve of the camera lens assembly according to the sixth embodiment, representing deviations of different heights of images formed by lights passing through the lens assembly and located on the image plane. FIG. 12E illustrates the relative illumination curve of the camera lens assembly according to the sixth embodiment, representing relative illuminations corresponding to image heights on the image plane. It can be seen from FIGS. 12A-12E that the camera lens assembly according to the sixth embodiment can achieve a good imaging quality.

Seventh Embodiment

Figure 13:
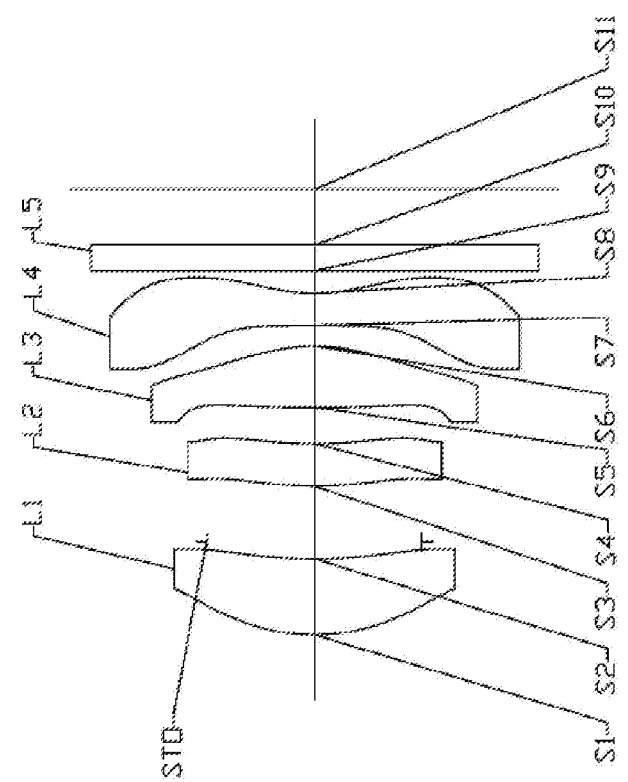
FIG. 13 is a schematic structural diagram illustrating a camera lens assembly according to a seventh embodiment of the present disclosure.

A camera lens assembly according to the seventh embodiment of the present disclosure is described below with reference to FIGS. 13-14E. FIG. 13 is a schematic structural diagram illustrating the camera lens assembly according to the seventh embodiment of the present disclosure.

As shown in FIG. 13, the camera lens assembly includes, sequentially along an optical axis from an object side to an image side, a first lens L1, a second lens L2, a third lens L3, a fourth lens L4, and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. The object-side surface S1 and the image-side surface S2 of the first lens L1 are both aspheric surfaces.

The second lens L2 has a positive refractive power, an object-side surface S3 of the second lens L2 is a convex surface, and an image-side surface S4 of the second lens L2 is a concave surface. The object-side surface S3 and the image-side surface S4 of the second lens L2 are both aspheric surfaces.

The third lens L3 has a positive refractive power, an object-side surface S5 of the third lens L3 is a convex surface, and an image-side surface S6 of the third lens L3 is a convex surface. The object-side surface S5 and the image-side surface S6 of the third lens L3 are both aspheric surfaces.

The fourth lens L4 has a negative refractive power, an object-side surface S7 of the fourth lens L4 is a concave surface, and an image-side surface S8 of the fourth lens L4 is a concave surface. The object-side surface S7 and the image-side surface S8 of the fourth lens L4 are both aspheric surfaces.

Alternatively, the camera lens assembly may further include an optical filter L5 having an object-side surface S9 and an image-side surface S10. The optical filter L5 may be an infrared bandpass filter. Lights from an object sequentially pass through the surfaces S1-S10 and finally form an image on the image plane S11.

Alternatively, a diaphragm STO for limiting light beams may be disposed between the first lens L1 and the second lens L2, to improve the imaging quality of the camera lens assembly.

Table 19 shows the surface type, the radius of curvature, the thickness, the material and the conic coefficient of each lens of the camera lens assembly in the seventh embodiment. The units of the radius of curvature and the thickness are both millimeters (mm). Table 20 shows the high-order coefficients applicable to each aspheric surface in the seventh embodiment. The surface type of each aspheric surface may be defined by the formula (1) given in the first embodiment. Table 21 shows the total effective focal length f of the camera lens assembly in The seventh embodiment, the effective focal lengths f1-f4 of the lenses, the half ImgH of the diagonal length of the effective pixel area on the image plane of the camera lens assembly, and the total track length TTL of the camera lens assembly.

TABLE 19

| surface number | surface type | radius of curvature | thickness | material refractive index | abbe number | conic coefficient |
|---|---|---|---|---|---|---|
| OBJ | spherical | infinite | 400.0000 | | | |
| S1 | aspheric | 1.6148 | 0.6139 | 1.62 | 23.5 | −0.2419 |
| S2 | aspheric | 3.7759 | 0.1356 | | | −3.2904 |
| STO | spherical | infinite | 0.4505 | | | |
| S3 | aspheric | 2.6204 | 0.3444 | 1.53 | 55.8 | −33.8623 |
| S4 | aspheric | 3.3989 | 0.2936 | | | −5.0920 |
| S5 | aspheric | 22.0369 | 0.4955 | 1.53 | 55.8 | 0.0000 |
| S6 | aspheric | −1.2231 | 0.1641 | | | −12.4622 |
| S7 | aspheric | −34.1148 | 0.2600 | 1.53 | 55.8 | −15.9809 |
| S8 | aspheric | 1.3890 | 0.1824 | | | −3.9092 |
| S9 | spherical | infinite | 0.2100 | 1.52 | 64.2 | |
| S10 | spherical | infinite | 0.4501 | | | |
| S11 | spherical | infinite | | | | |

TABLE 20

| surface number | A4 | A6 | A8 | A10 | A12 | A14 | A16 |
|---|---|---|---|---|---|---|---|
| S1 | −1.0082E−02 | −1.3226E−02 | 2.9056E−03 | 6.9244E−03 | −3.1481E−02 | 2.1629E−02 | −5.1705E−03 |
| S2 | −2.4608E−02 | 2.0413E−03 | −2.4382E−02 | −1.4647E−02 | −1.0636E−02 | 5.0419E−02 | −2.5124E−02 |
| S3 | 2.3108E−02 | −4.9641E−02 | −2.4065E−02 | 2.4119E−01 | 1.8248E−02 | −6.8138E−02 | 2.2980E−02 |
| S4 | −7.2907E−02 | −3.6797E−02 | −1.1042E−01 | 1.7116E−01 | −2.1745E−01 | 1.2981E−01 | 1.4286E−02 |
| S5 | 7.8851E−02 | −1.0625E−01 | 1.0834E−01 | −2.3351E−01 | 1.7066E−01 | −7.9201E−02 | 1.5354E−02 |
| S6 | −8.7334E−02 | 1.2519E−01 | −5.9275E−02 | 8.5334E−03 | −5.6340E−04 | 1.7758E−05 | −2.1705E−07 |
| S7 | −1.6032E−02 | −6.5518E−01 | 8.5780E−01 | −4.8134E−01 | 1.4193E−01 | −2.1562E−02 | 1.3338E−03 |
| S8 | −2.0882E−01 | 4.6067E−02 | 3.2161E−02 | −2.3506E−02 | 3.8837E−03 | 0.0000E+00 | 0.0000E+00 |

TABLE 21

| | parameter | | | | | |
|---|---|---|---|---|---|---|
| | f (mm) | f1 (mm) | f2 (mm) | f3 (mm) | f4 (mm) | ImgH (mm) | TTL (mm) |
| numerical value | 2.61 | 4.10 | 18.81 | 2.21 | −2.52 | 1.98 | 3.60 |

Figure 14A:
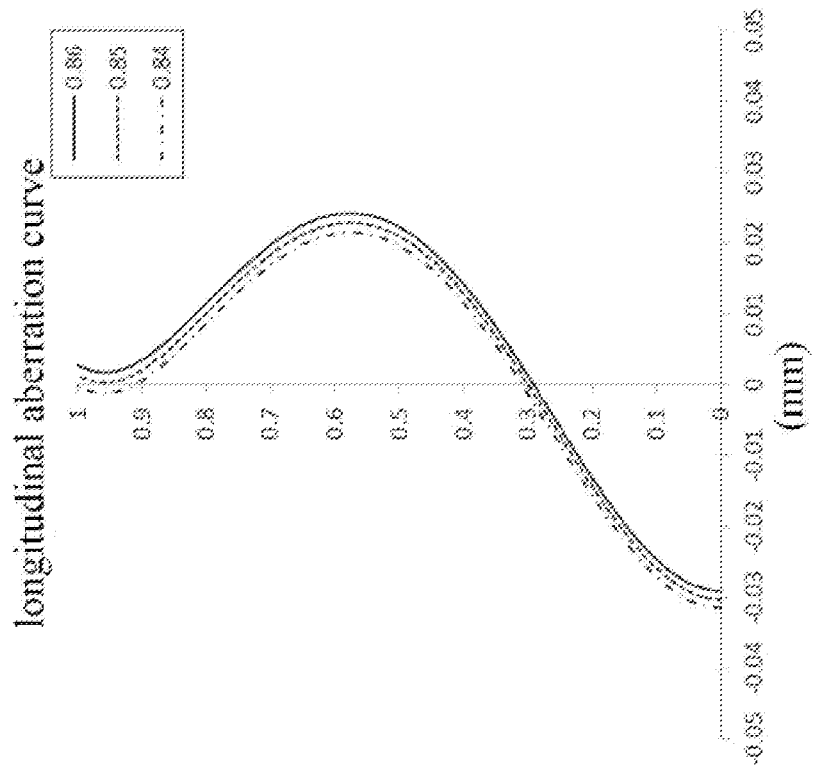

FIG. 14A illustrates the longitudinal aberration curve of the camera lens assembly according to the seventh embodiment, representing deviations of focal points where lights of different wavelengths converge after passing through the lens assembly. FIG. 14B illustrates the astigmatic curve of the camera lens assembly according to the seventh embodiment, representing a curvature of the tangential image plane and a curvature of the sagittal image plane. FIG. 14C illustrates the distortion curve of the camera lens assembly according to the seventh embodiment, representing degrees of distortion at different viewing angles. FIG. 14D illustrates the lateral color curve of the camera lens assembly according to the seventh embodiment, representing deviations of different heights of images formed by lights passing through the lens assembly and located on the image plane. FIG. 14E illustrates the relative illumination curve of the camera lens assembly according to the seventh embodiment, representing relative illuminations corresponding to image heights on the image plane. It can be seen from FIGS. 14A-14E that the camera lens assembly according to the seventh embodiment can achieve a good imaging quality.

To sum up, the first to seventh embodiments respectively satisfy the relationships shown in Table 22 below.

TABLE 22

| Conditional Expression | Embodiment | | | | | | |
|---|---|---|---|---|---|---|---|
| | 1 | 2 | 3 | 4 | 5 | 6 | 7 |
| f/EPD | 1.12 | 1.20 | 1.24 | 1.24 | 1.04 | 1.29 | 1.24 |
| R3/R4 | 0.73 | 0.85 | 0.66 | 0.65 | 0.69 | 0.75 | 0.77 |
| f2/f | 2.56 | 4.69 | 2.85 | 2.74 | 2.39 | 2.98 | 7.19 |
| R1/f | 0.74 | 0.71 | 0.62 | 0.58 | 0.74 | 0.67 | 0.62 |
| T12/TTL | 0.06 | 0.08 | 0.11 | 0.11 | 0.06 | 0.06 | 0.16 |
| CT1/CT3 | 0.82 | 0.80 | 1.10 | 1.22 | 1.12 | 0.67 | 1.24 |
| CT1/(CT2 + CT3) | 0.52 | 0.53 | 0.62 | 0.67 | 0.65 | 0.43 | 0.73 |
| ΣCT/TTL | 0.48 | 0.51 | 0.46 | 0.46 | 0.50 | 0.47 | 0.48 |
| DT11/ImgH | 0.61 | 0.60 | 0.57 | 0.57 | 0.63 | 0.52 | 0.57 |
| DT42/ImgH | 0.99 | 0.95 | 0.84 | 0.83 | 0.99 | 0.99 | 0.84 |
| SAG21/CT2 | 0.45 | 0.30 | 0.60 | 0.58 | 0.43 | 0.15 | 0.17 |

The present disclosure further provides a camera device having an electronic photosensitive element which may be a photosensitive charge-coupled device (CCD) or complementary metal-oxide semiconductor (CMOS) element. The camera device may be an independent camera device such as a digital camera, or may be a camera module integrated in a mobile electronic device such as a mobile phone. The camera device is equipped with the camera lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A camera lens assembly comprising, along an optical axis from an object side to an image side, a first lens, a second lens, a third lens, and a fourth lens in sequence, wherein an object-side surface of the first lens and an object-side surface of the second lens are convex surfaces;
an image-side surface of the third lens is a convex surface;
an image-side surface of the fourth lens is a concave surface;
each of the first lens and the third lens has a positive refractive power;
each of the second lens and the fourth lens has a positive refractive power or a negative refractive power; and
a total effective focal length f of the camera lens assembly and an entrance pupil diameter EPD of the camera lens assembly satisfy: f/EPD<1.5,
wherein the camera lens assembly has and only has four lenses having refractive power; and
wherein an image-side surface of the second lens is a concave surface, and a radius R3 of curvature of the object-side surface of the second lens and a radius R4 of curvature of the image-side surface of the second lens satisfy: 0.5<R3/R4<1.

2. The camera lens assembly according to claim 1, wherein the second lens has a positive refractive power, and an effective focal length f2 of the second lens and the total effective focal length f of the camera lens assembly satisfy: 2<f2/f<8.

3. The camera lens assembly according to claim 1, wherein a radius R1 of curvature of the object-side surface of the first lens and the total effective focal length f of the camera lens assembly satisfy: 0.5<R1/f<1.2.

4. The camera lens assembly according to claim 1, wherein a spacing distance T12 along the optical axis between the first lens and the second lens and an axial distance TTL from the object-side surface of the first lens to an image plane of the camera lens assembly satisfy: T12/TTL<0.2.

5. The camera lens assembly according to claim 1, wherein a center thickness CT1 of the first lens along the optical axis and a center thickness CT3 of the third lens along the optical axis satisfy: 0.6<CT1/CT3<1.3.

6. The camera lens assembly according to claim 1, wherein a center thickness CT1 of the first lens along the optical axis, a center thickness CT2 of the second lens along the optical axis, and a center thickness CT3 of the third lens along the optical axis satisfy: 0.4<CT1/(CT2+CT3)<0.9.

7. The camera lens assembly according to claim 1, wherein an effective semi-diameter DT11 of the object-side surface of the first lens and a half ImgH of a diagonal length of an effective pixel area on an image plane of the camera lens assembly satisfy: 0.5<DT11/ImgH<1.

8. The camera lens assembly according to claim 1, wherein an effective semi-diameter DT42 of the image-side surface of the fourth lens and a half ImgH of a diagonal length of an effective pixel area on an image plane of the camera lens assembly satisfy: 0.7<DT42/ImgH<1.

9. The camera lens assembly according to claim 1, wherein a distance SAG21 along the optical axis from an intersection point of the object-side surface of the second lens with the optical axis to a vertex of an effective semi-diameter of the object-side surface of the second lens and a center thickness CT2 of the second lens along the optical axis satisfy: 0<SAG21/CT2<0.7.

10. The camera lens assembly according to claim 1, further comprising an infrared bandpass filter disposed between the fourth lens and an image plane.

11. A camera lens assembly comprising, along an optical axis from an object side to an image side, a first lens, a second lens, a third lens, and a fourth lens in sequence, wherein an object-side surface of the first lens is a convex surface; at least one of an object-side surface of the third lens or an image-side surface of the third lens is a convex surface; at least one of an object-side surface of the fourth lens or an image-side surface of the fourth lens is a concave surface; at least two of the first lens, the third lens, and the fourth lens have positive refractive powers; and the second lens has a positive refractive power, and an effective focal length f2 of the second lens and a total effective focal length f of the camera lens assembly satisfy: 2<f2/f<8, wherein the camera lens assembly has and only has four lenses having refractive power; and wherein a radius R3 of curvature of an object-side surface of the second lens and a radius R4 of curvature of an image-side surface of the second lens satisfy: 0.5<R3/R4<1; and a total effective focal length f of the camera lens assembly and an entrance pupil diameter EPD of the camera lens assembly satisfy: f/EPD<1.5.

12. The camera lens assembly according to claim 11, wherein each of the first lens and the third lens has a positive refractive power.

13. The camera lens assembly according to claim 12, wherein a center thickness CT1 of the first lens along the optical axis and a center thickness CT3 of the third lens along the optical axis satisfy: 0.6<CT1/CT3<1.3.

14. The camera lens assembly according to claim 11, wherein the image-side surface of the fourth lens is a concave surface.

15. The camera lens assembly according to claim 11, wherein an effective semi-diameter DT11 of the object-side surface of the first lens and a half ImgH of a diagonal length of an effective pixel area on an image plane of the camera lens assembly satisfy: 0.5<DT11/ImgH<1.

16. The camera lens assembly according to claim 11, wherein the object-side surface of the second lens is a convex surface, and the image-side surface of the second lens is a concave surface.

17. The camera lens assembly according to claim 16, wherein a distance SAG21 along the optical axis from an intersection point of the object-side surface of the second lens with the optical axis to a vertex of an effective semi-diameter of the object-side surface of the second lens and a center thickness CT2 of the second lens along the optical axis satisfy: 0<SAG21/CT2<0.7.

18. The camera lens assembly according to claim 11, wherein a radius R1 of curvature of the object-side surface of the first lens and the total effective focal length f of the camera lens assembly satisfy: 0.5<R1/f<1.2.

* * * * *